United States Patent

Kako et al.

[11] Patent Number: 6,024,062
[45] Date of Patent: Feb. 15, 2000

[54] HYDRAULIC APPARATUS FOR ADJUSTING THE TIMING OF OPENING AND CLOSING OF AN ENGINE VALVE

[75] Inventors: Hajime Kako, Tokyo; Katsuyuki Fukuhara, Hyogo; Mutsuo Sekiya, Tokyo, all of Japan

[73] Assignee: Mitsubishi Denki Kabushiki Kaisha, Tokyo, Japan

[21] Appl. No.: 09/189,978

[22] Filed: Nov. 12, 1998

[30] Foreign Application Priority Data

Nov. 14, 1997 [JP] Japan ..................................... 9-314099
Oct. 15, 1998 [JP] Japan .................................... 10-294115

[51] Int. Cl.⁷ ..................................................... F01L 1/344
[52] U.S. Cl. ..................................... 123/90.17; 123/90.31
[58] Field of Search ............................... 123/90.15, 90.16, 123/90.17, 90.31

[56] References Cited

U.S. PATENT DOCUMENTS

| | | | |
|---|---|---|---|
| 5,146,886 | 9/1992 | Mannle et al. ........................... | 123/325 |
| 5,611,304 | 3/1997 | Shinojima ............................. | 123/90.15 |
| 5,738,056 | 4/1998 | Mikame et al. ....................... | 123/90.17 |
| 5,836,276 | 11/1998 | Iwasaki et al. ....................... | 123/90.17 |
| 5,875,750 | 3/1999 | Iwasaki et al. ....................... | 123/90.17 |

FOREIGN PATENT DOCUMENTS

| | | |
|---|---|---|
| 787 892 | 8/1997 | European Pat. Off. . |
| 859130 | 8/1998 | European Pat. Off. . |
| 9-151709 | 6/1997 | Japan . |

*Primary Examiner*—Weilun Lo
*Attorney, Agent, or Firm*—Sughrue, Mion, Zinn, Macpeak & Seas, PLLC

[57] ABSTRACT

A hydraulic apparatus for adjusting the timing of opening and closing of an engine valve of a prior art has the drawback that sludge from the oil pressure chamber tends to accumulate on the inner surface of the housing of the actuator, which controls the rotor in a valve timing adjusting system for controlling the valve timing of the engine. This causes troubles in the operation of the rotor. In the present invention, while the fuel delivery to the engine M1 is being cut off, the hydraulic media providing means M10 is controlled by the timing advance control means M13 to rotate further the rotor from the position at the moment that the fuel delivery is cut off, so as to clean the inner side of the housing of the actuator M9, the control of the setting and the execution of the cleaning mode is carried out by a cleaning condition judging means M14. A mode exchange means M15 controls the hydraulic media providing means M10 to exchange its normal mode and the cleaning mode, according to the state of the engine.

7 Claims, 16 Drawing Sheets

DIRECTION OF ROTATION

DIRECTION OF ROTATION

DIRECTION OF ROTATION

CRANK ANGLE SIGNAL

CAM ANGLE SIGNAL (AT MAXIMUM TIMING RETARD)

CAM ANGLE SIGNAL (AT TIMING ADVANCE)

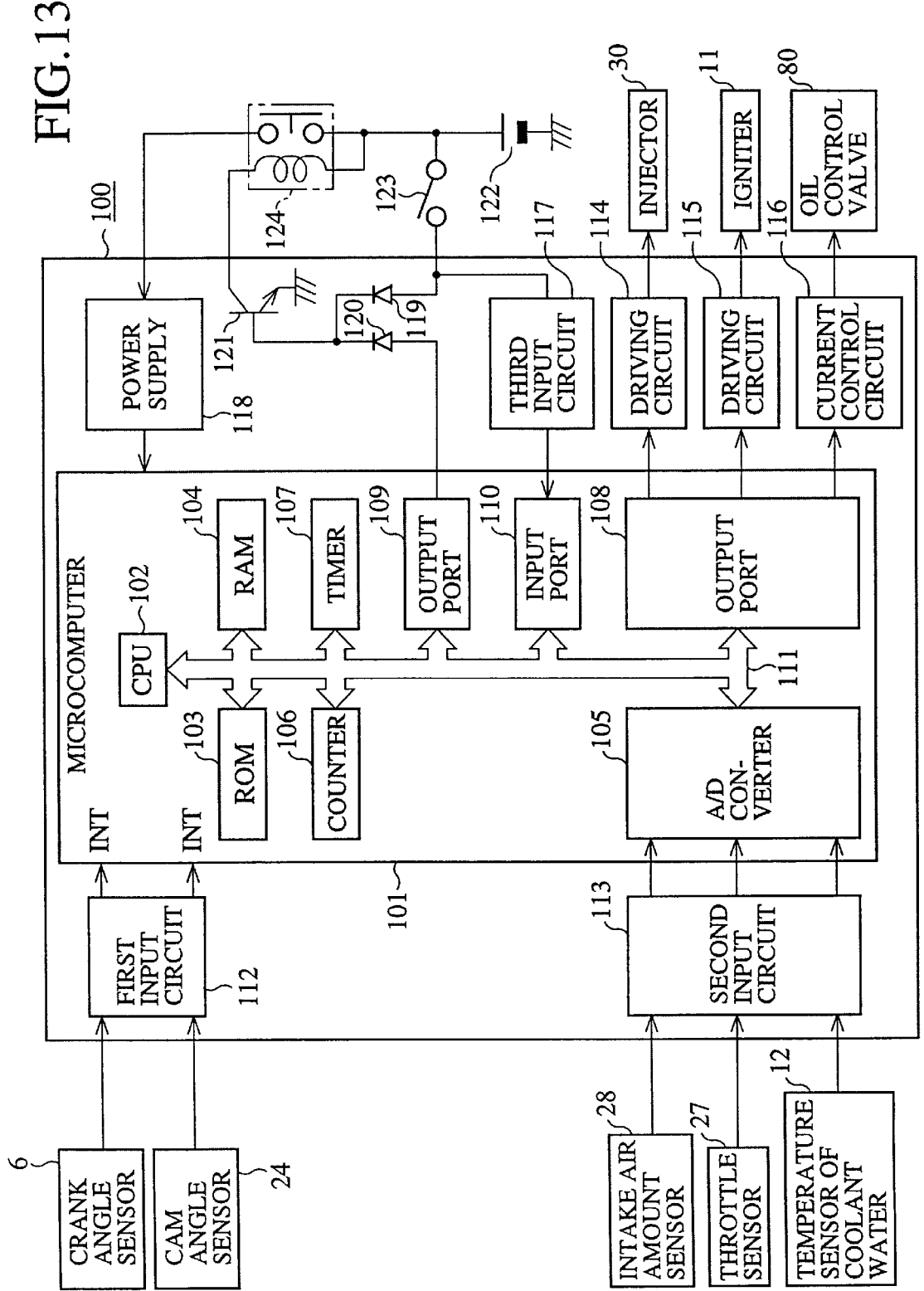

FIG.16
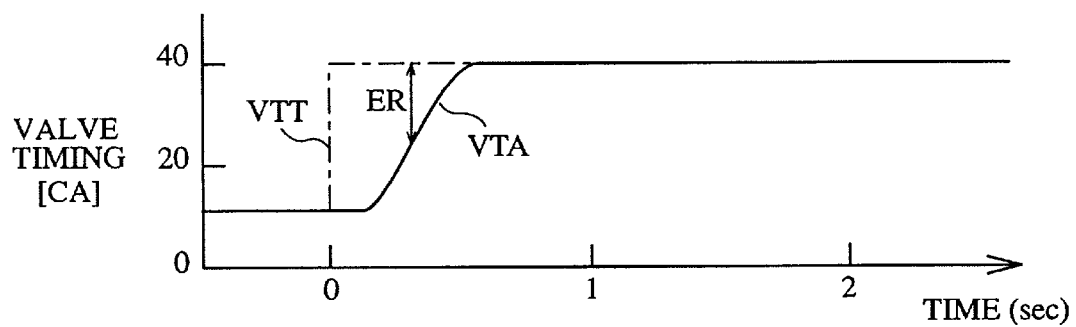
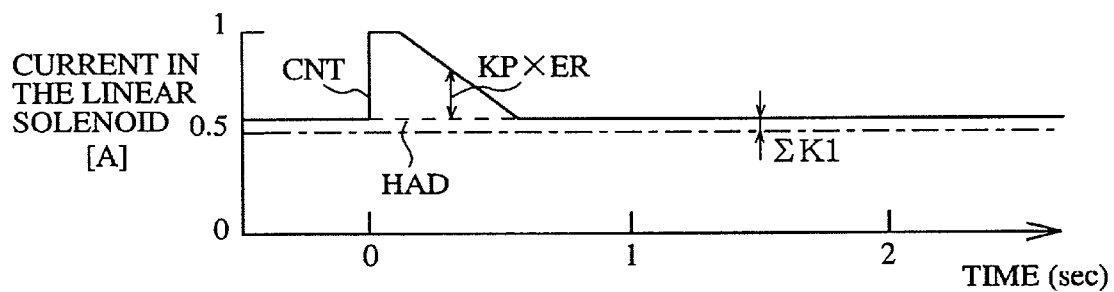

HYDRAULIC APPARATUS FOR ADJUSTING THE TIMING OF OPENING AND CLOSING OF AN ENGINE VALVE

BACKGROUND OF THE INVENTION

1. Field of the Invention

The present invention relates to a hydraulic apparatus for adjusting the timing of opening and closing of an engine valve, for changing the timing of opening and closing of intake valve and/or exhaust valve of an engine, according to the operation state of the engine, using an actuator which controls the flow of a working oil which flows therein. More particularly, the present invention relates to a hydraulic apparatus for adjusting the timing of opening and closing of an engine valve by which the cleaning of the actuator is possible.

2. Description of the Prior Art

Such hydraulic apparatuses for adjusting the timing of opening and closing of an engine valve are disclosed, as prior art, in JP7-139319A, JP7-139320A, JP8-28219A, JP8-121122A, JP9-60507A, JP9-60508A in which cam shafts are driven using a timing pulley synchronized with the engine crank shaft and a chain sprocket. A vane type valve timing mechanism is arranged between the timing pulley and the cam shaft, which is driven by an actuator using a working oil provided from an oil pump through an oil control valve (hereinafter to be called "OCV"), so as to rotate the cam shaft relative to the crank shaft, to advance or to retract the cam shaft relative to the crank shaft rotation. Thus the timing of opening or closing of engine valve relative to the engine shaft rotation is shifted, for the purpose of reducing exhaust gases and improving of fuel efficiency.

The actuator employed in such a hydraulic apparatus for adjusting the timing of opening and closing of an engine valve in the prior art has a structure that allows the rotor to slide in its housing, and a working oil is provided from an OCV, so as to rotate towards the timing advance direction or to the timing retard direction.

An actuator employed in such a hydraulic apparatus for adjusting the timing of opening and closing of an engine valve in the prior art has drawbacks caused by such a structure: sludge in the working oil provided into the actuator housing tends to deposit on the inner surface of the housing, because of the centrifugal force of the rotor; additionally, the rotor in a normal operation rotates rarely to the most advanced angle position, thus the sludge deposited on the inner surface of the housing tends to accumulate at the most advanced angle region (a portion of the housing inner surface to where the rotor does not reach), by being pushed by the rotor; this accumulation causes problems, when the rotor is shifted in a wide range, in such a case, the rotor is forced to climb over the accumulation of the sludge, this can be an obstacle to the function of the rotor.

SUMMARY OF THE INVENTION

An object of the present invention is to avoid the aforementioned problems, and to propose a hydraulic apparatus for adjusting the timing of opening and closing of an engine valve, in which the housing of the actuator can be cleaned by a rotor, when fuel delivery is cut off.

Another object of the present invention is to propose a hydraulic apparatus for adjusting the timing of opening and closing of an engine valve, in which all over the inner surface of the housing of the actuator, where the rotor can reach, can be cleaned by a rotor, when fuel delivery is cut off.

A further object of the present invention is to propose a hydraulic apparatus for adjusting the timing of opening and closing of an engine valve, which can improve the fuel efficiency, without reducing the so called "power zone" of an engine.

A hydraulic apparatus for adjusting the timing of opening and closing of an engine valve according to the present invention comprises: as shown in the schematic block diagram of FIG. 1, an intake valve M5 and an exhaust valve M6 which are driven in synchronization with the rotation of the shaft of the engine M1, so as to control the opening and closing of the intake channel M3 and exhaust channel M4 communicating with the combustion chamber M2 respectively, means M7 for detecting the operation state of the engine M1;

means M8 for calculating a theoretical valve timing corresponding to the operation state of the engine M1, on the basis of the output of the means M7 for detecting the operation state of the engine;

an actuator M9 for changing the timing of opening and closing of valve, by rotating the rotor towards the timing advance direction or towards the timing retard direction, so as to change the timing of the opening and closing of the intake valve and/or the exhaust valve;

a hydraulic media providing means M10 for providing a hydraulic media to the actuator M9 to drive the rotor, whereby the flow rate of the media is controllable;

a timing detector M11 for detecting the actual timings of opening and closing of the intake valve M5 and/or the exhaust valve M6;

a valve timing controller M12 for controlling the actuator M9, by controlling the hydraulic media providing means M10, so as that the actual timings of opening and closing of the valves change to the theoretical timing;

characterized in that the hydraulic apparatus for adjusting the timing of opening and closing of an engine valve further comprises:

an advance angle control means M13 for controlling the hydraulic media providing means M10 so as to rotate further the rotor from the position at the moment of fuel delivery cutting off, while the fuel delivery is cut off;

a cleaning condition judging means M14 which judges as to whether the rotor shall be further rotated, based on the engine state, for example, the rotation rate and the load of the engine M1. When the cleaning conditions judging means judges that a further rotation of rotor is necessary, it sets and executes a cleaning mode, in which the rotor is rotated to a further advanced position so as to clean the inner surface of the housing;

a mode exchanging means M15 for exchanging the hydraulic media providing means M10 between modes, a normal mode and a cleaning mode, based on the operation state of the engine, whereby in the normal mode the engine runs without the cleaning.

In an aspect of the present invention, the timing advance control means controls the hydraulic media providing means so as that the rotor rotates further from the theoretical valve timing position to reach to the maximum advanced angle position, while the fuel delivery is cut off.

In another aspect of the present invention, the timing advance control means controls the hydraulic media providing means so as that the rotor rotates further from the theoretical valve timing position, when the theoretical valve exceeds over a predetermined value.

In a further other aspect of the present invention, the advance angle control means cancels the cleaning mode at a moment after a predetermined period has elapsed after the setting and execution of the cleaning mode, which is set and executed according to the result of the cleaning condition judging means.

In a further aspect of the present invention, the timing advance control means controls the hydraulic media providing means so as that the rotor rotate to reach to the maximum timing advance position, when the state of engine is in a middle range of velocity and load.

In a further aspect of the present invention, the timing advance control means controls the hydraulic media providing means to return immediately towards the timing retard direction at the moment that the rotor reaches at the maximum advanced angle position.

BRIEF DESCRIPTION OF THE DRAWINGS

FIG. 13 is a block diagram of the inner structure of the electronic control unit.

FIG. 16 is a time chart for explaining the operation of a controller having an integral element, when that the actual holding current HLD is biased toward greater side compared with the standard holding current 0.5 A.

DETAILED DESCRIPTION OF THE PREFERRED EMBODIMENT

An embodiment of the Present Invention is Described below.

Embodiment

Figure 1:
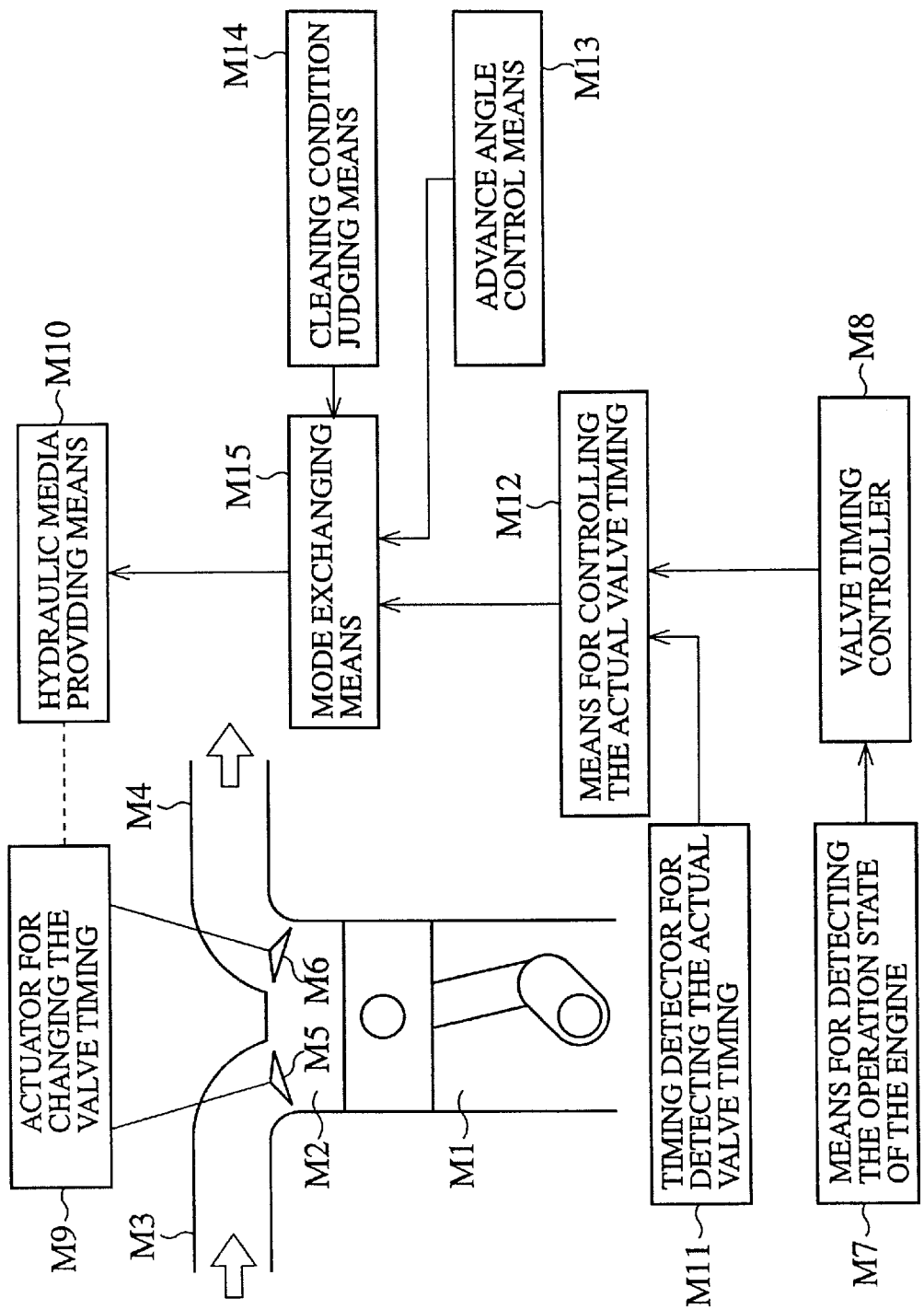
FIG. 1 is a schematic diagram of the present invention.
Figure 2:
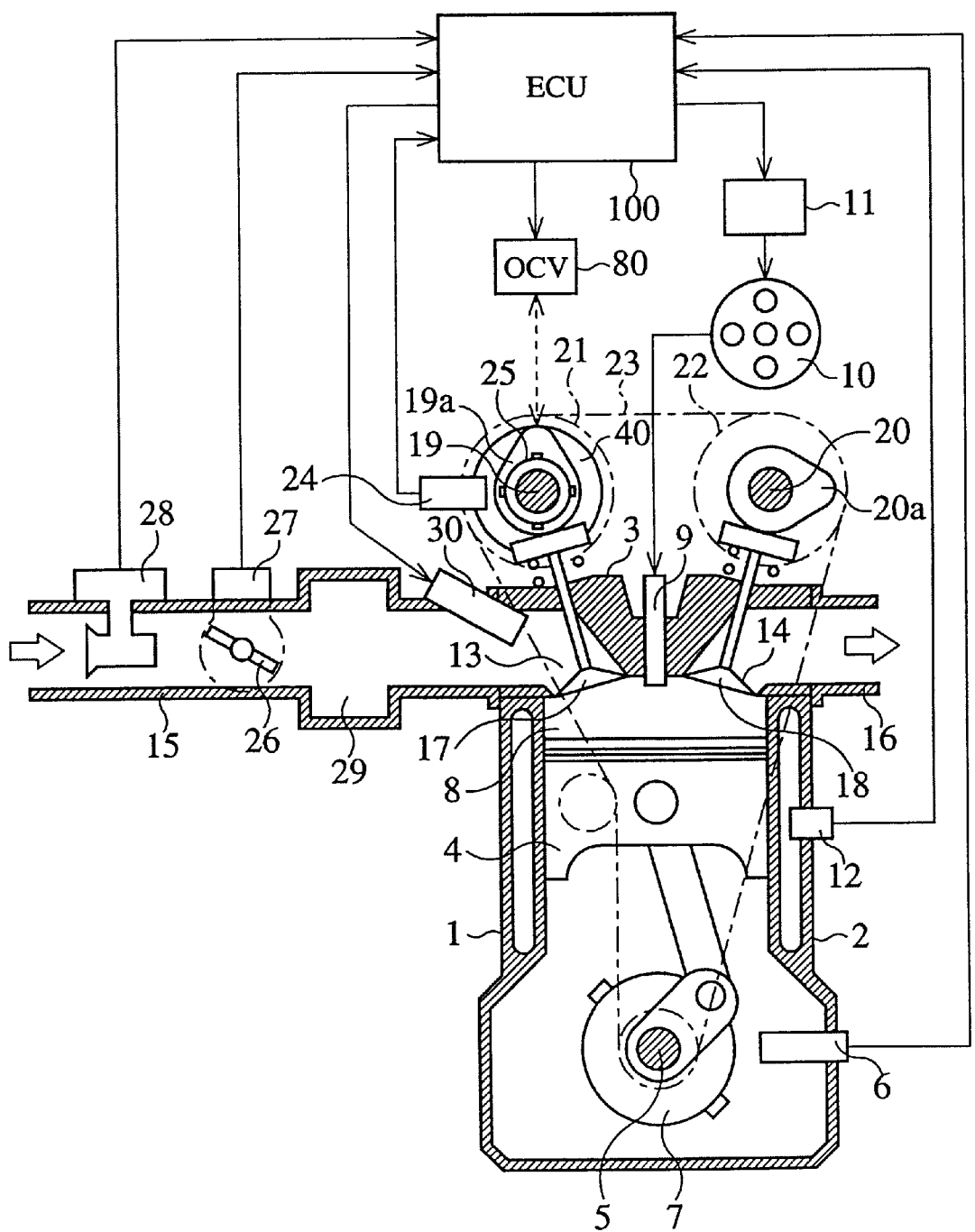
FIG. 2 is a schematic cross sectional view of a gasoline engine system provided with a hydraulic apparatus for adjusting the timing of opening and closing of an engine valve of an aspect of the present invention.

FIG. 2 is a schematic cross sectional view of a gasoline engine system provided with a hydraulic apparatus for adjusting the timing of opening and closing of an engine valve in an aspect of the present invention. In the figure, 1 denotes an engine 1 (M1 in FIG. 1) having a plurality of cylinders, only one of which is shown. 2 is a cylinder block forming a cylinder of the engine 1, 3 is a cylinder head arranged at upper portion of the cylinder block 2, 4 is a piston which moves up and down in each cylinder of the cylinder block 2, 5 is a crank shaft connected to the lower end of the piston 4, the crank shaft 5 is driven to rotate by the up and down movement of the piston 4.

6 is a crank angle sensor for detecting the rotation rate of the engine 1 and for detecting whether the crank shaft 5 is in the predetermined angle position or not. 7 is a signal rotor connected with the crank shaft 5, which has two teeth on its periphery at each 180° position. The crank angle sensor 6 generates a pulse as a crank angle detection signal, every time one of the teeth passes in front of the sensor 6.

8 is a combustion chamber (M2 in FIG. 1) in which the fuel-air mixture burns, the chamber 8 is contoured by the inner surface of the cylinder block 2 and the cylinder head 3 as well as the upper portion of the piston 4. 9 is a ignition plug to ignite the fuel-air mixture in the combustion chamber 8, the plug 9 is installed at the upper portion of the cylinder head 3 and protrudes into the combustion chamber 8. 10 is a distributor connected to an exhaust side cam shaft 20, which will be explained later. 11 is an igniter for generating a high voltage. Each ignition plug is connected with the distributor 10 through a wire line (not shown) for high voltage. The high voltage generated in the igniter 11 is distributed by the distributor 10 to each ignition plug 9, in synchronization with the rotation of the crank shaft 5.

12 is a temperature sensor of a coolant water installed in the cylinder block 2 for detecting the temperature of coolant water (coolant water temperature) THW which flows through a coolant water channel. 13 and 14 are, respectively, an intake port and an exhaust port made in the cylinder head 3. 15 and 16 are, respectively, an intake channel (M3 in FIG. 1) communicating with the intake port 13 and an exhaust channel (M4 in FIG. 1) communicating with the exhaust port 14. 17 is an intake valve (M5 in FIG. 1) arranged in the cylinder head 3 for opening and closing the intake port 13. 18 is an exhaust valve (M6 in FIG. 1) arranged in the cylinder head 3 for opening and closing the exhaust port 14.

19 is an intake side cam shaft arranged over the intake valve 17. 19a is an intake side cam, which can rotate in synchronization with the intake side cam shaft 19, for opening or closing the intake valve 17. 20 is an exhaust side cam shaft arranged over the exhaust valve 18. 20*a* is an exhaust side cam, which can rotate in synchronization with the exhaust side cam shaft 20, for opening or to closing the exhaust valve 17. 21 is an intake side timing pulley arranged at an end of the intake side cam shaft 20. 22 is an exhaust side timing pulley arranged at an end of the exhaust side cam shaft 21. 23 is a timing belt for linking the timing pulleys 21, 22 with the crank shaft 5.

When the engine rotates, the rotational force is transmitted from the crank shaft 5 to each cam shaft 19,20 through the timing belt 23, and each of the timing pulleys 21,22. Each cam 19*a*, 20*a* rotates together with the each cam shaft 19,20 as a one body, and the intake valve 17 and the exhaust valve 18 are driven to be opened or closed, in synchronization with the rotation of the crank shaft 5 and the up and down movement of the pistons 4, i.e., are driven with a predetermined timing in synchronization with the four phases of the engine 1, including an intake phase, a compression phase, an explosion and expansion phase and an exhaust phase of the engine.

Reference numeral 24 denotes a cam angle sensor, disposed near to the intake side cam shaft, for detecting the actual timing of opening and closing of the intake valve 17, (so called valve timing). 25 is a signal rotor linked with the intake side cam shaft 19. Four teeth are formed on the peripheral surface of the signal rotor 25 at each 90° position. The cam angle sensor 24 generates a pulse as a cam angle signal, when one of these teeth passes in front of this sensor.

26 is a throttle valve disposed in the intake channel 15. The amount of intake air is adjusted by the opening and closing of the valve 26, which is linked with an acceleration pedal (not shown). 27 is a throttle sensor linked with the throttle valve 26 for detecting the degree of opening of the throttle valve TVO. 28 is an intake air sensor, disposed at a position upstream of the throttle valve 26, for detecting the air flow rate AQ (air amount) to be provided into the engine 1. 29 is a surge tank, disposed at a position downstream of the throttle valve 26, to suppress the pulsation of intake air. 30 is an injector, disposed near to the intake port 13 of each cylinder, which delivers fuel into the combustion chamber 8. The injector 30 includes a solenoid valve, which opens when an electric current is provided. Fuel is urged to be pressed into the port 13 by a pressure of a fuel pump (not shown).

When the engine 1 runs, air is provided into the intake passage 15, simultaneously, fuel is injected from each injectors towards the intake port 13. As a result, a fuel-air mixture is formed in the intake port 13. When the intake valve 17 is opened at the intake phase of the engine, the fuel-air mixture is delivered into the combustion chamber 8.

Reference numeral 40 is an actuator linked with the intake side cam shaft 19 for changing the valve timing (M9 in FIG. 1). The working oil of this actuator 40 is lubrication oil of the engine. The actuator is driven by the working oil to change the angle position of the intake side cam shaft 19 relative to the intake timing pulley 21, which causes a continuous change of the valve timing of opening and closing of the intake valve 17. Its detailed structure and the functions will be explained later.

Reference numeral 80 is an OCV, namely, an oil control valve, (M1 in FIG. 1), for controlling the amount of oil to be provided into the actuator 40. Its structure and the function will be explained later.

Reference numeral 100 denotes an electronic control unit (called "ECU" hereinafter), which drives the injector 30, the igniter 11, and the OCV 80 according to the signals mainly from the intake air sensor 28, the throttle sensor 27, the temperature sensor of the coolant water 12, the crank angle sensor 6 and the cam angle sensor 24. The ECU controls the amount of fuel injection, the ignition timing, and the timing of opening and closing of valves, as well as controls the closing time of the OCV 80 after the TURN Off of an ignition switch, which will be later explained. The structure and the function of the ECU will be explained later, too.

Figure 3:
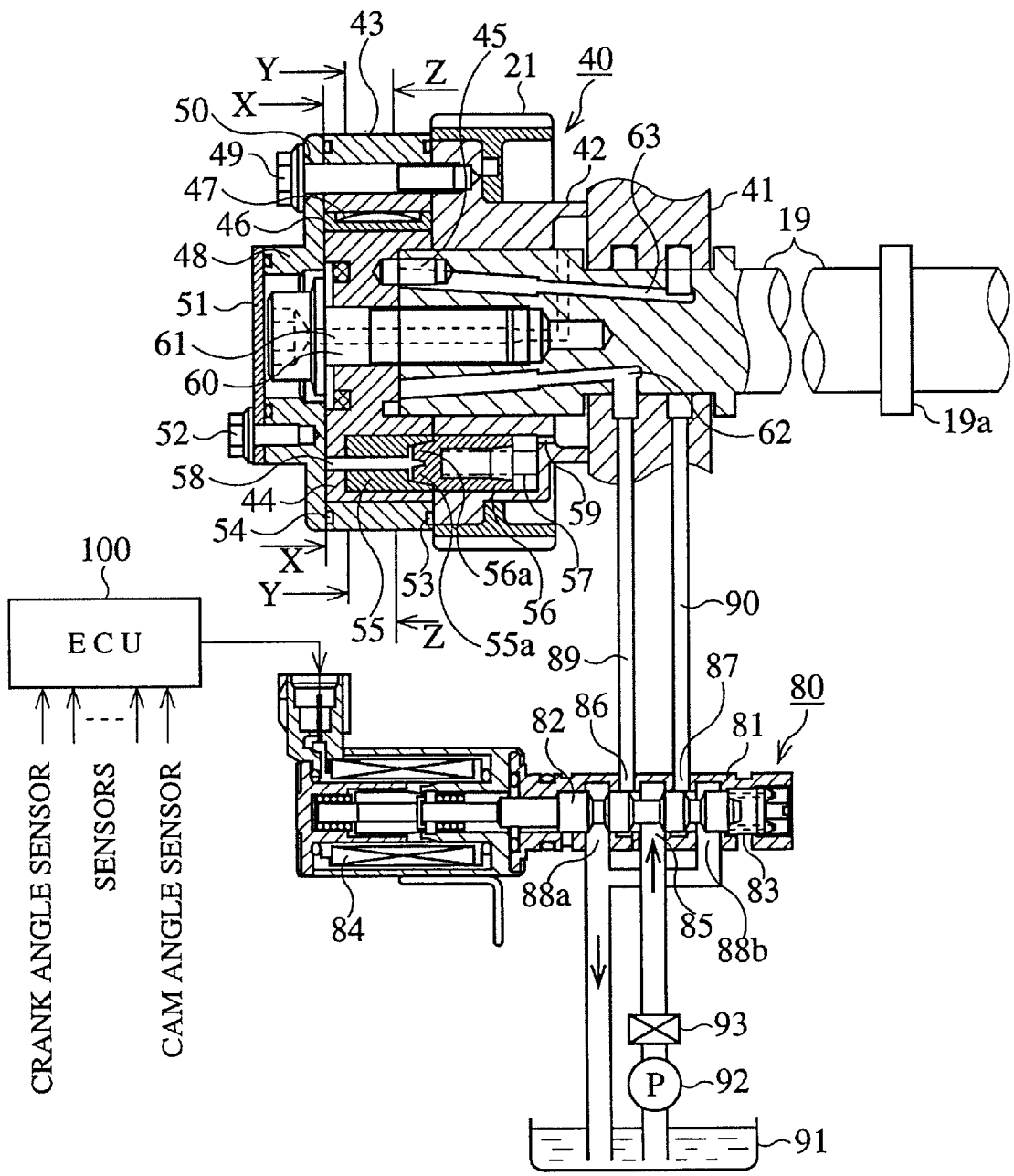
FIG. 3 is a cross sectional view of a hydraulic apparatus for adjusting the timing of opening and closing of an engine valve in an aspect of the present invention.
Figure 4:
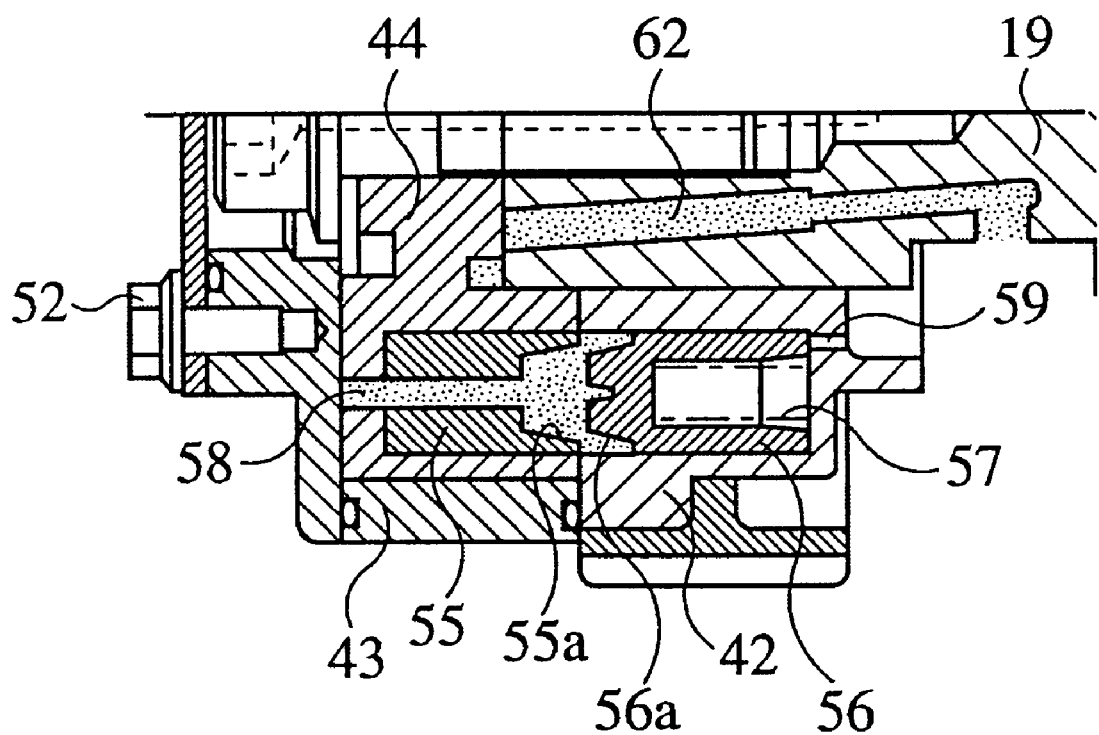
FIG. 4 is a cross sectional view of a hydraulic apparatus for adjusting the timing of opening and closing of an engine valve, shown in FIG. 3, in the state that the plunger in the figure is impelled a hydraulic force.

FIGS. 3 and 4 are cross sectional views showing an embodiment of the hydraulic apparatus for adjusting the timing of opening and closing of an engine valve according to the present invention. In these figures, reference numeral 40 is an actuator for adjusting the valve timing of the intake valve 17. Its structure and the function are explained below. The elements equivalent to those in FIG. 2 are provided similar reference numerals, and their explanations are omitted.

In FIG. 3, reference numeral 41 denotes a bearing of the intake side cam shaft 19, 42 is the housing of the actuator 40, which is fixed to the intake side cam shaft 19 and can pivot therearound. 43 is a case fixed to the housing 42. 44 is a vane type rotor fixedly connected to the intake side shaft 19 by means of a bolt 45 and received in the housing 42. This rotor 44 can rotate relative to the case 43. 46 is a chip seal disposed between the case 43 and rotor 44, so as to prevent oil flow between hydraulic chambers contoured by the case 43 and the rotor 44.

47 is a back spring, disposed between the case 43 and the chip seal 46, which is composed of a plate spring urging the chip seal 46 towards the rotor 44. 48 is a cover fixed to the case 43. 49 is a bolt to fix the housing 42, the case 43 and the cover 48. 50 is an O-ring to prevent an outward oil leakage through the gap between the bolt 49 and the hole. 51 is a plate fixed to the cover 48 by a screw 52. The housing of the actuator is composed of the housing 42, case 43 and cover 48.

53 is an O-ring, disposed between the housing 42 and the case 43, for preventing oil leakage. 54 is an O-ring, disposed between the case 43 and the cover 43, for preventing an oil leakage. 55 is a holder, installed at the rotor 44, which has a recess 55*a* at an end of its longitudinal axis so as to engage with a plunger 56. The plunger 56 will be explained below. 57 is a spring for urging the plunger towards the holder 55. 58 is an plunger oil channel for introducing the working oil into the holder 55. When the plunger 56 is shifted against the spring 57, by introducing working oil into the recess 55*a* of the holder 55 from the plunger oil channel 58, the locking of the plunger 56 to the holder 55 is cancelled.

59 is an air hole in the housing 42 to maintain constant the pressure at the spring 57 side of the plunger 57 equal to atmospheric pressure. 60 is an axial bolt for connecting the intake side cam shaft 19 and the rotor 44 to fix to each other at their axial center portion. This axial bolt 60 can rotate relative to the cover 48. 61 is an air hole made at the axial bolt 60 and at the intake side cam shaft 19, to maintain the pressure of the inner side of the plate 51 to be identical to the atmospheric pressure.

62 is a first oil channel made in the intake side cam shaft 19 and in the rotor 44. The first oil channel 62 is connected to a timing retard oil pressure chamber 73 so as to shift the rotor towards the timing retard direction. 63 is a second oil channel made also in the intake side cam shaft 19 and in the rotor 44. The second oil chamber 63 is connected to a timing advance oil pressure chamber 74 so as to shift the rotor towards the timing advance direction. The chambers 73 and 74 will be explained later.

The structure of the OCV 80 (oil control valve), for controlling the pressure of the working oil to be supplied to the actuator 40 in FIG. 3, of which structure is explained above, is explained below.

81 is a housing of the OCV 80 (to be called "valve housing" hereinafter). 82 is a spool which slides in the valve housing 81. 83 is a spring for urging the spool 82 in one direction. 84 is a linear solenoid to move the spool 82 against the biasing force of the spring 83. 85 is a supply port (input port) made in the valve housing 81. 86 is an A port (output port) made in the valve housing 81. 87 is a B port (output port) made in the valve housing 81. 88a and 88b are drain ports made in the valve housing 81. 88 is a common drain port connected with the drain ports 88a and 88b. 89 is a first channel connecting the first oil channel 62 and the A port. 90 is a second channel connecting the second oil channel 63 and the B port. 91 is an oil pan. 92 is an oil pump. 93 is an oil filter.

The suction side of the oil pump 92 is connected into the oil pan 91, and the discharge side is connected the supply port 85 through the oil filter 93. The drain channel 88 is introduced into the oil pan 91.

The oil pan 91, oil pump 92 and the oil filter 93 constitute the lubrication system of the engine 1. Simultaneously, they constitute, co-operating with the OCV 80, a working oil supplying system to the actuator 40.

Figure 5:
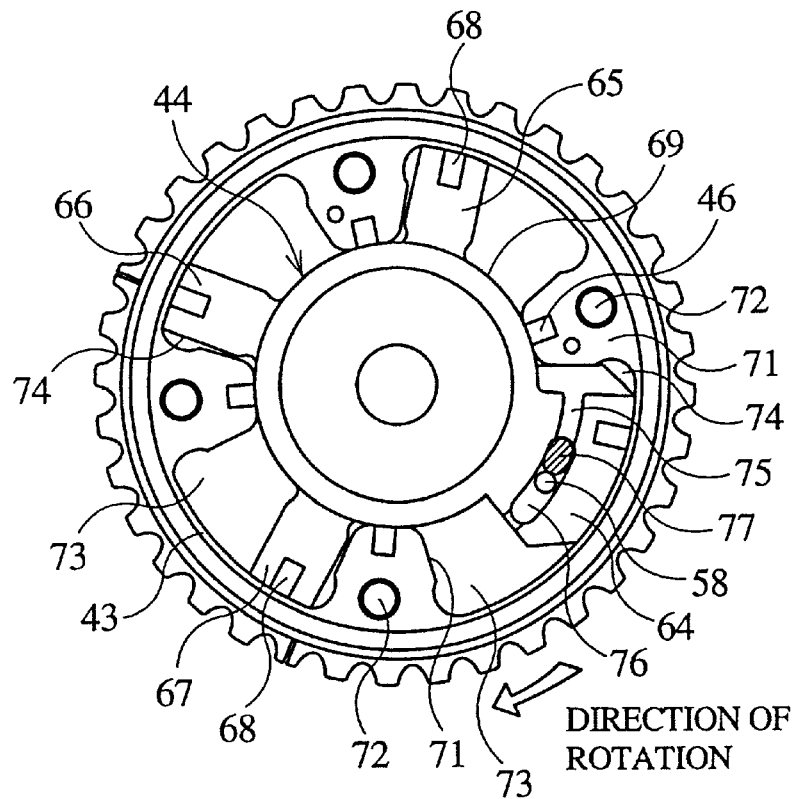
FIG. 5 is an cross sectional view of FIG. 3 along X—X line.
Figure 6:
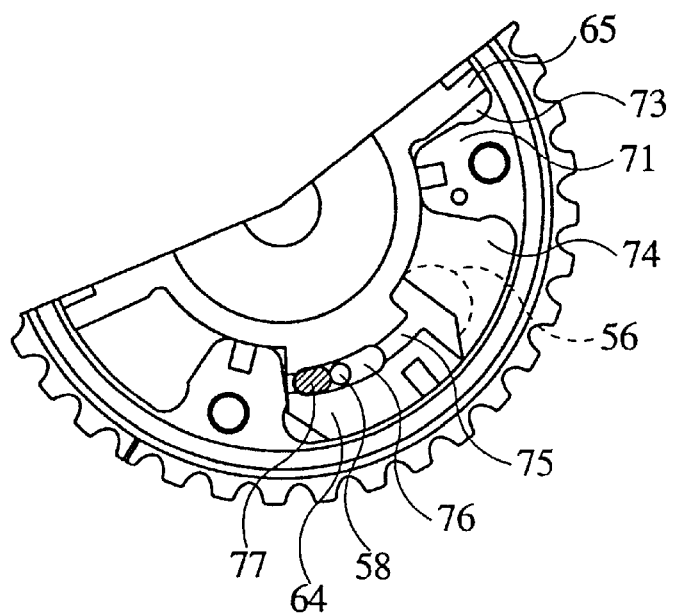
FIG. 6 is a partial cross sectional view of FIG. 5, shown in the state that the slide plate in the figure is shifted.
Figure 7:
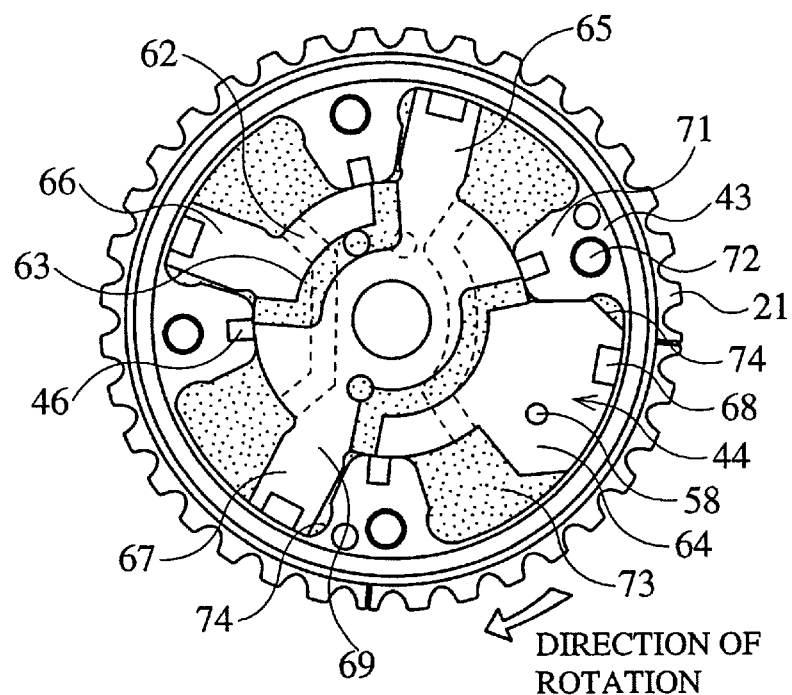
FIG. 7 is a cross sectional view of FIG. 3 along Y—Y line.
Figure 8:
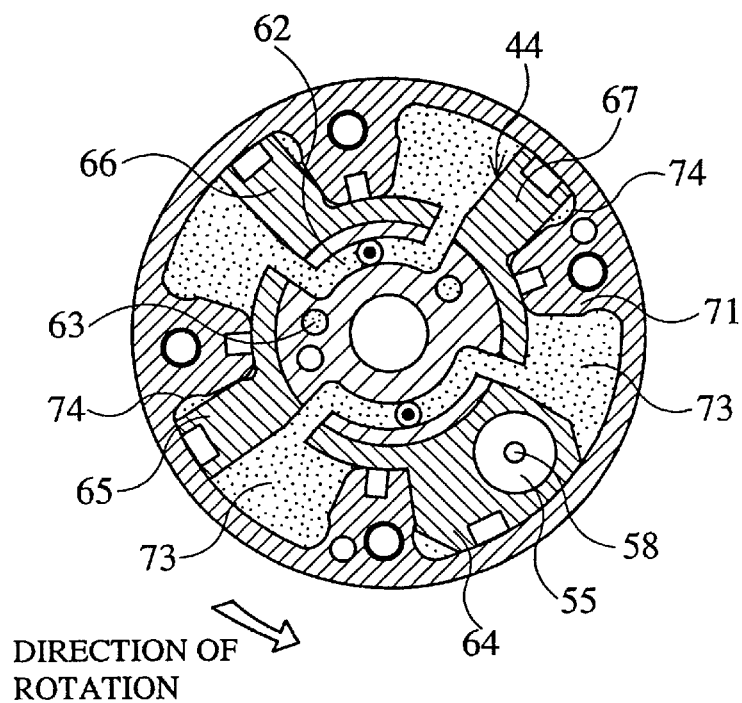
FIG. 8 is a cross sectional view of FIG. 3 along Z—Z line.

FIG. 5 is a cross sectional view of FIG. 3 along the line X—X. FIG. 6 is a partial cross sectional view of FIG. 5 showing the slide plate in FIG. 5 as shifted. FIG. 7 is a cross sectional view of FIG. 3 along the line Y—Y. FIG. 8 is a cross sectional view of FIG. 3 along the line Z—Z.

In these figures, reference numerals 64–67 are first to fourth vanes projecting in the radial direction from the rotor 44. The tips of these vanes 64–67 slide along the inner surface of the case 43, contacting with it. A chip seal 68 is arranged at the sliding portion of each vane.

71 are a plurality of shoes (four shoes in this figure), projecting from the inner surface of the case 43 equidistantly. 72 are bolts disposed in the shoes 71, into which the bolts 49 in FIG. 3 are inserted. The tips of the shoes 71 contact with a vane supporting member 69, and slide along it. The vane supporting member 69 is the center portion of the rotor 44. The chip seals 46, mentioned in relation to FIG. 3, are arranged at the tip portion.

73 is a timing retard oil pressure chamber for rotating the first to fourth vanes 64–67 towards the timing retard direction. 74 is a timing advance oil pressure chamber for rotating the first to fourth vanes 64–67 towards the timing advance direction. These oil chambers 73 and 74 are formed between the case 43 and the rotor 44 as sector-like rooms.

75 is a connecting channel made in the first vane 64 for connecting the timing retard oil pressure chamber 75 and the timing advance oil pressure chamber 74 at the both sides of this vane. 76 is a displacement groove formed as a recess made in the connecting channel 75. The plunger oil channel 58 communicates with an intermediate part of the displacement groove 76. 77 is a slide plate dividing the displacement groove into two parts for preventing oil leakage between the timing retard oil pressure chamber 73 and the timing advance oil pressure chamber 74. The slide plate can move in the displacement groove. That is to say, the slide plate 77 moves towards the timing advance oil pressure chamber 73, as shown in FIG. 6, when the pressure in the timing retard oil pressure chamber is higher. On the other hand, when the pressure in the timing advance oil pressure chamber 74 is higher, the plate moves towards the timing retard oil pressure chamber 73.

78 is a chip seal arranged on each vane 64–67, for sealing between the case 43 and each vane 64–67 so as to protect the oil leakage. The arrows in FIGS. 5,7,8 represent the rotation angle of the actuator 40 as a whole.

The timing retard oil pressure chamber 73 and the timing advance oil pressure chamber 74 are contoured by the housing 42, the case 43, the rotor 44 and the cover 48. The timing retard oil pressure chamber 73 communicates with the first oil channel 62, through which a working oil is supplied into the chamber 73. The timing advance oil pressure chamber 74 communicates with the second oil channel 63, through which a working oil is supplied into the chamber 74. Corresponding to the working oil amounts supplied into these chambers 73 and 74, the rotor 44 rotates relatively to the housing 42, and as a result, the volumes of the timing retard oil chamber 73 and the timing advance oil chamber 74 change respectively.

The operations of the actuator 40 and the OCV 80 are explained below.

When the engine 1 is stopped, the rotor 44 is positioned at the maximum timing retard position, as shown in FIG. 5, in other words, the rotor is found at the position at the maximum rotated in the timing advance direction relative to the housing 42. The oil pump 92 is stopped as well.

Thus no working oil is supplied into the first oil channel 62, the second oil channel 63, nor the plunger oil channel 58. Then the oil pressure in the actuator 40 is low. As a result, the plunger 56 is pressed against the holder 55 by the spring 57, in this state, the plunger 56 and the holder 55 is engaging to each other; the housing 42 and the rotor 44 are in a locked state.

When the engine 1 begins to run starting from this state, the oil pump 92 works to increase the pressure of the working oil supplied into the OCV 80. Then a working oil is supplied into the timing retard oil pressure chamber 73 from the A port of the OCV 80 through the first channel 89 and the first oil channel 62. The oil pressure in the timing retard oil pressure chamber 73 causes a displacement of the slide plate 77 towards the timing advance oil pressure chamber 74. Thus the plunger 56 is forced to move towards the housing 42, and the locking between the housing 42 and rotor 44 is cancelled.

Because a working oil is supplied into the timing retard oil pressure chamber 73, the vanes 64–67 of the rotor 44 are pressed into contact with the shoe 71. Consequently, the housing 42 and the rotor 44 are in abutment with each other due to the oil pressure in the timing retard oil pressure chamber 73, even after the cancellation of the locking. Thus vibration or shock can be eliminated or reduced.

Because the plunger 56 can be displaced by the oil pressure in the timing retard oil pressure chamber 73, the locking between the plunger 56 and rotor 44 can be cancelled when a predetermined oil pressure (sufficient to displace the slide plate 77 and the plunger 56) is obtained after a start of the engine 1, as explained above. This makes it possible to rotate the rotor 44 in the timing advance direction immediately, in any time when it becomes necessary.

When the B port of the OCV 80 is opened to rotate the rotor 44 towards the timing advance direction, a working oil is supplied into the timing advance oil chamber 74 from the second channel 90 through the second oil channel 63. Then the working oil flows into the connecting channel 75 to press the slide plate 77. As a result, the slide plate 77 moves towards the timing retard oil pressure chamber 73. As a result of this movement of the slide plate 77, the plunger oil channel 58 communicates with the connecting channel 75 at the timing advance oil pressure chamber 74 side. Then a working oil is supplied into the plunger oil channel 58 from the timing advance oil pressure chamber 74 to displace the plunger 56 towards the housing 42 side against the biasing force of the spring 57; thus, the locking between the plunger 56 and the holder 55 is cancelled.

By adjusting the oil amounts in the timing retard oil pressure chamber 73 and the timing advance oil chamber 74, in this lock-cancelled state, by opening or closing the A port and B port of the OCV 80 so as to adjust the oil supply, it is possible to rotate the rotor 44 towards the timing advance direction or towards the timing retard direction relative to the rotating housing 42. For example, when the rotor 44 is rotated up to the maximum timing advance position, each vane of the rotor 44 rotates, in such a state that they are contacting with the shoe 71 of the timing retard oil pressure chamber 73 side.

When the oil pressure in the timing retard oil pressure chamber 73 is greater than that in the timing advance oil pressure chamber 74, the rotor 44 rotates towards the timing retard direction relative to the housing 42. In this manner, it is possible to adjust the timing advance or the timing retard of the rotor 44 relative to the housing 42, by adjusting the oil supply to the timing retard oil pressure chamber 73 and the timing retard oil pressure chamber 74.

The supply oil pressure of the OCV 80 can be controlled by the ECU 100, on the ground of the output of relative rotation angle of the rotor 44 against the housing 42, which is detected by a position sensor, and the output of the crank angle sensor, which determines the pressure of the oil pump 92. The ECU 100 will be explained later.

Figure 9A:
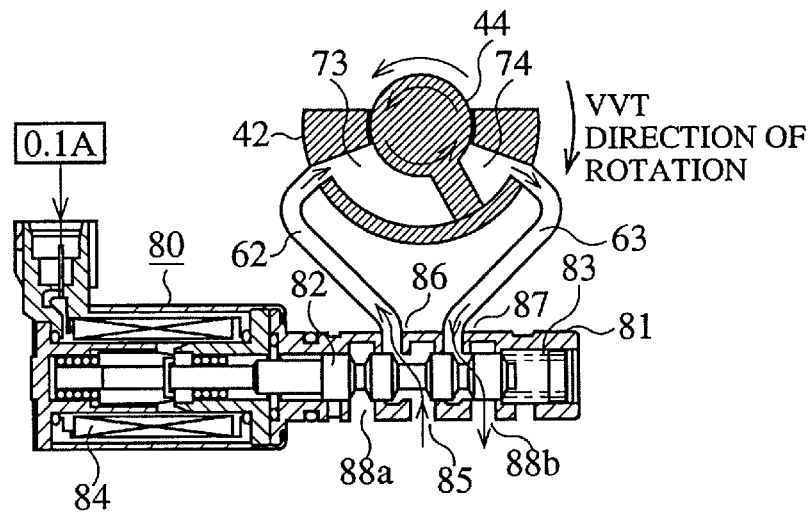
FIG. 9a through c show representative operational states of the oil control valve.
Figure 9B:
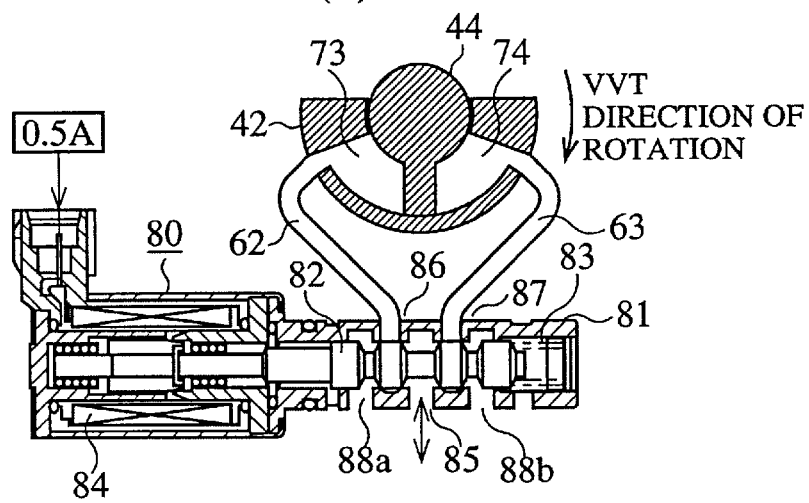
Figure 9C:
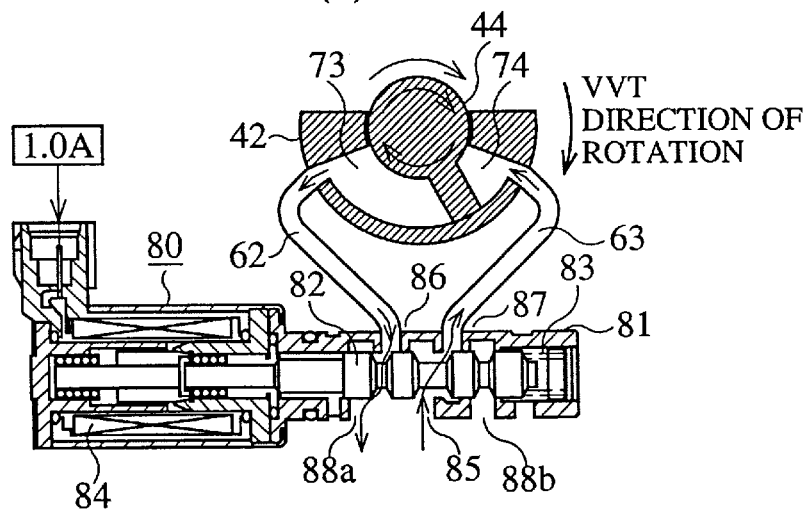

FIGS. 9(a)–(c) show representative operation states of the oil control valve. FIG. 9(a) shows an example of the control current from the ECU 100 being 0.1 A. The spool 82 is pressed up to the left end of the valve housing 81, as a result, the supply port 85 and the A port 86 communicate to each other, and the B port 87 and the drain port 88b communicate to each other. In this state, a working oil is supplied into the timing retard oil pressure chamber 73, on the other hand, the oil in the timing advance oil pressure chamber 74 is exhausted. Consequently, the rotor 44 in FIG. 9(a) rotates counterclockwise against the rotating housing 42. This means that the phase of the intake side cam shaft 19 is retarded against the phase of intake side timing pulley 21, i.e., a timing retard control is realized.

FIG. 9(b) shows an example of the control current from the ECU 100 being 0.5 A, in which the forces of the linear solenoid 84 and the spring 83 are in balance; the spool 82 is maintained at a position where the spool 82 closes both of the A port 86 and the B port 87; working oil is not supplied nor exhausted to and from the timing retard oil pressure chamber 73 nor the timing advance oil chamber 74. In this state, if there is not any oil leakage from the timing retard oil pressure chamber 73 nor from the timing advance oil pressure chamber 74, the rotor 44 is held at this position, and the phase relation between the intake side timing pulley 21 and intake side cam shaft 19 remains unchanged.

FIG. 9(c) shows an example of the control current from the ECU 100 being 1.0 A. The spool 82 is pressed up to the right end of the valve housing 81, as a result, the supply port 85 and the B port 87 communicate to each other, and the A port 86 and the drain port 88a communicate to each other. In this state, a working oil is supplied into the timing advance oil pressure chamber 74, on the other hand, the oil in the timing retard oil pressure chamber 73 is discharged. Consequently, the rotor 44 in FIG. 9(c) rotates clockwise against the rotating housing 42. This means that the phase of the intake side cam shaft 19 is in timing advance against the phase of intake side timing pulley 21, i.e., a timing advance control is realized.

In FIGS. 9(a), (b), (c), the hydraulic resistance between the supply port 85 and the A port 86 (or B port 87) and the hydraulic resistance between the drain port 88b (or drain port 85b) and the B port are controlled by the position of the spool 82. A linear relation stands between the position of the spool 82 and the electric current of the linear solenoid 84.

Figure 10:
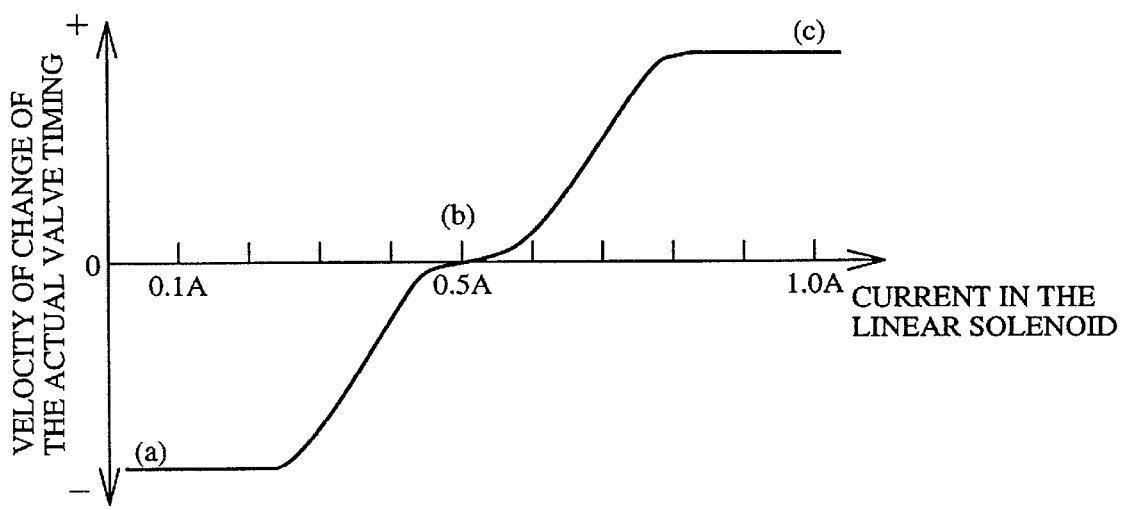
FIG. 10 is a characteristic curve between the linear solenoid current and the speed of change of the actual valve timing.
Figure 11:
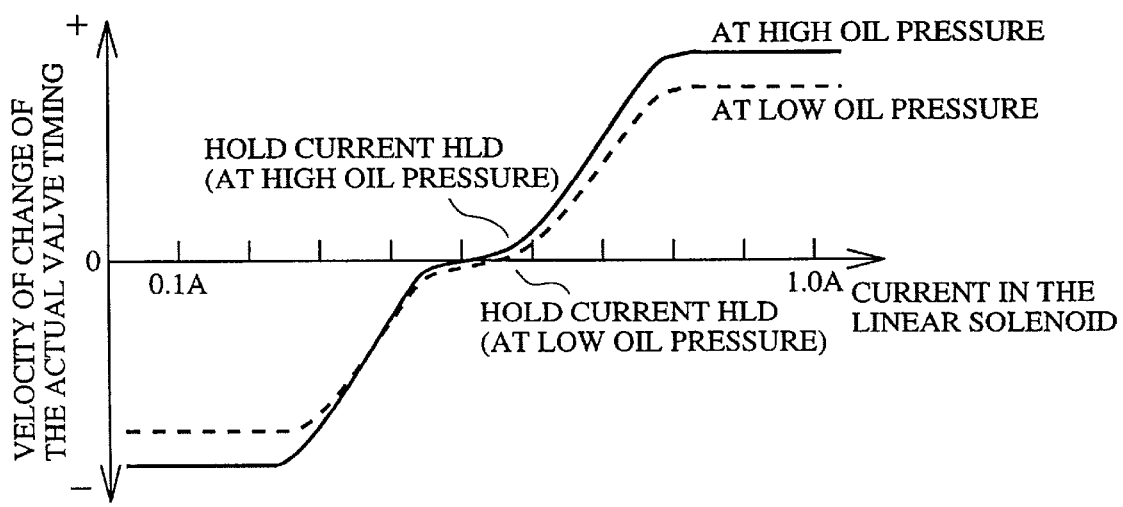
FIG. 11 is a characteristic curve between the linear solenoid current and the speed of change of the actual valve timing.

FIG. 10 is a characteristic curve between the linear solenoid current (to be called "solenoid current" hereinafter) and the speed of change of the actual valve timing at an operation condition. In the figure, the positive region of the speed of change of the actual valve timing corresponds to a state in which the rotor rotates towards the timing advance direction, on the other hand, the negative region thereof corresponds to a state in which the rotor rotates towards the timing retard direction.

The letters (a),(b),(c) in FIG. 10 represent the electric currents which correspond to the solenoid positions (a),(b), (c) of the spools 82 in FIG. 9. There is a only one solenoid current, as an unique point, at which the actual valve timing does not change, as shown by the letter (b). At this current, the total amount of the leakage of oil from the first channel 89, the second channel 90 and the seals of the spool 82 balances with the amount of the working oil supply from the oil pump 92.

This unique point fluctuates, because the characteristic curve changes according in the change of the supply working oil discharge pressure, which changes in turn according to the rotation rate or temperature of the temperature. Additionally, the manner of change of the characteristic curve and the fluctuation of the unique point are different for each product, because of the unevenness of the dimensions of the spool 82, for example. This unique point, where the actual valve timing does not change, will be called as "hold current" and marked by "HLD" hereinafter. This hold current HLD is a norm current, namely, by setting the solenoid current greater than the hold current HLD, one can realize a timing advance control, namely the valve timing is shifted in the timing advance direction; and by setting the solenoid current to be smaller than the hold current HLD, one can realize a timing retard control.

Figure 12A:
FIGS. 12a through c show phases of crank angle and a cam angle signal, as well as a timing chart for calculation of an actual valve timing.
Figure 12B:
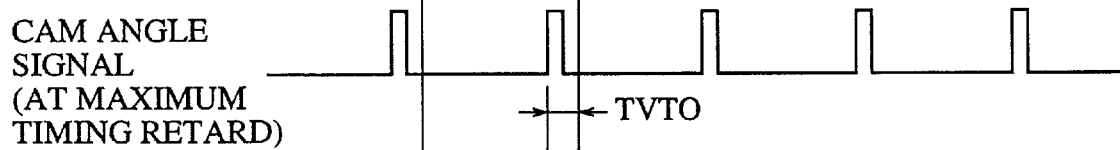
Figure 12C:
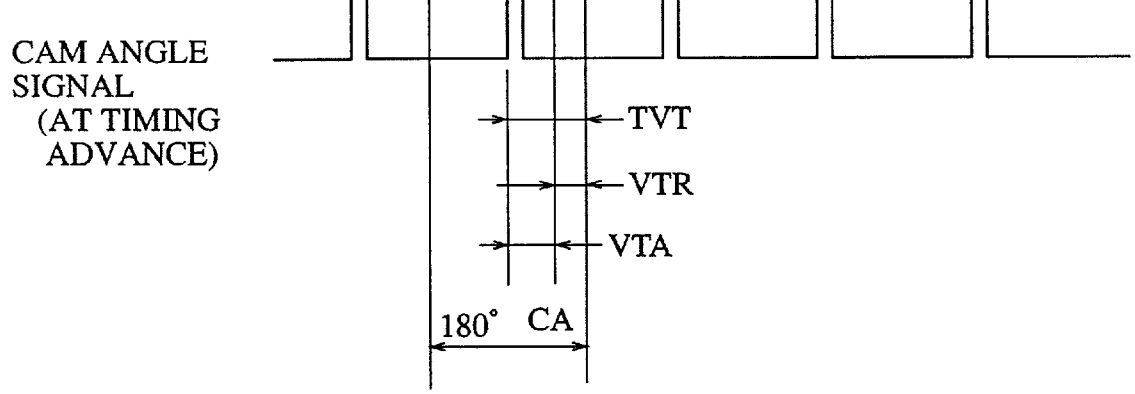

The method of detecting the valve timing is explained below, referring to FIG. 12. FIGS. 12(a),(b),c) show an example of a time chart of a crank angle signal, a cam angle signal at a timing retard, a cam angle signal at a timing advance, respectively. ECU 100 measures the period T of the crank angle signal and the phase difference corresponding to the time TVT elapsed from the cam angle signal to the crank angle signal. A maximum valve timing retard TVR is calculated from the period T of crank angle signal, and the phase difference TVTO at the state that timing retard is at most, using the mathematical formula (1).

$$VTR = (TVTO/T) \times 180° \text{ CA} \tag{1}$$

An actual valve timing TVA is calculated from the phase difference TVT, the period T of the crank angle signal and the valve timing retard at most VTR, using the mathematical formula (2).

$$VTA = (TVT/T) \times 180° \text{ CA} - VTR \tag{2}$$

Using a feed back control of the solenoid current, according to the error between this actual valve timing VTA and the theoretical valve timing VTT, ECU controls the actual valve timing VTA to converge to the theoretical valve timing VTT.

The inner structure of the ECU 100 is explained below. FIG. 13 is a schematic diagram of the inner structure of the ECU 100. In the figure, reference numeral 101 denotes a micro-computer comprising: a central processor unit (CPU) 102 for many sorts of calculations and decisions, a read only memory (ROM) 103 in which a predetermined programs are stored, a random access memory (RAM) 104 for temporal storage of data obtained by the CPU 102, an A/D converter 105 to convert an analog signal to a digital signal, a counter 106 to measure, for example, a period of an input signal, a timer 107 to measure, for example, the time duration of an output signal, an output port 108 to provide an output signal and a common bus 111 which connects these elements to each other.

Reference numeral 112 denotes a first input circuit, which performs a wave forming operation on the signals from the crank angle sensor 6 and cam angle sensor 24, then sends them to the micro-computer 101 as an interruption signal (INT). CPU 102 reads the value of the counter 106 for every INT signal, and stores the value into the RAM 104.

In a more detailed explanation, the first input circuit 112 performs a wave form, shaping on the signal from the crank angle sensor 6 and sends it to the micro-computer 101 as an interruption signal (INT); the micro-computer 102 reads the value of the counter 106 for every INT signal and stores it into the RAM 104; the period T of the crank angle signal is calculated from the present value and the previous last value; the engine rotation rate NE is calculated from the period T of the crank angle signal; and a phase difference TVT is calculated from the difference between this value and a value of the counter at a moment when a signal is sent from the cam angle sensor 24, which is stored in the RAM 104.

Reference numeral 113 denotes a second input circuit, which amplifies and noise-eliminates the input signals from the temperature sensor 12 of the coolant water, throttle sensor 27 and sensor of intake air amount 28, then sends them to the A/D converter 105, which converts them to digital signals depending on the coolant water temperature THW, the open degree of the throttle TVO, and the intake air amount QA.

Reference numerals 114 and 115 denote a driving circuit for driving the injector 30 and a driving circuit for driving the igniter 11, respectively. CPU 102 calculates the injector driving time and the timing of the ignition, on the ground of the aforementioned inputs, and drives the injector 30 and igniter 11 though the drivers 114 and 115, so as to control the amount of the fuel injection and the timing of the ignition.

Reference numeral 116 denotes an electric current control circuit for controlling the solenoid current. CPU 102 calculates the solenoid current CNT on the ground of aforementioned inputs, and sends to the output port 108 a duty ratio signal, which corresponds to a solenoid current CNT to be supplied, depending on the result of the measurement of the timer 107. The current control circuit 116 controls the valve timing, by controlling the electric current flowing in the solenoid 84 of the OCV 80, on the ground of the duty ratio, so as to make it to be the solenoid current CNT.

Reference numerals 118, 122, 123 denote, respectively, a power supply, battery and a key switch. The micro-computer 101 receives a voltage regulated electric power for its functions from the power supply 118, which receives an electric power from the battery 122 via the key switch 123, in turn.

The functions of CPU 102 are explained below referring FIGS. 14 to 16.

Figure 14:
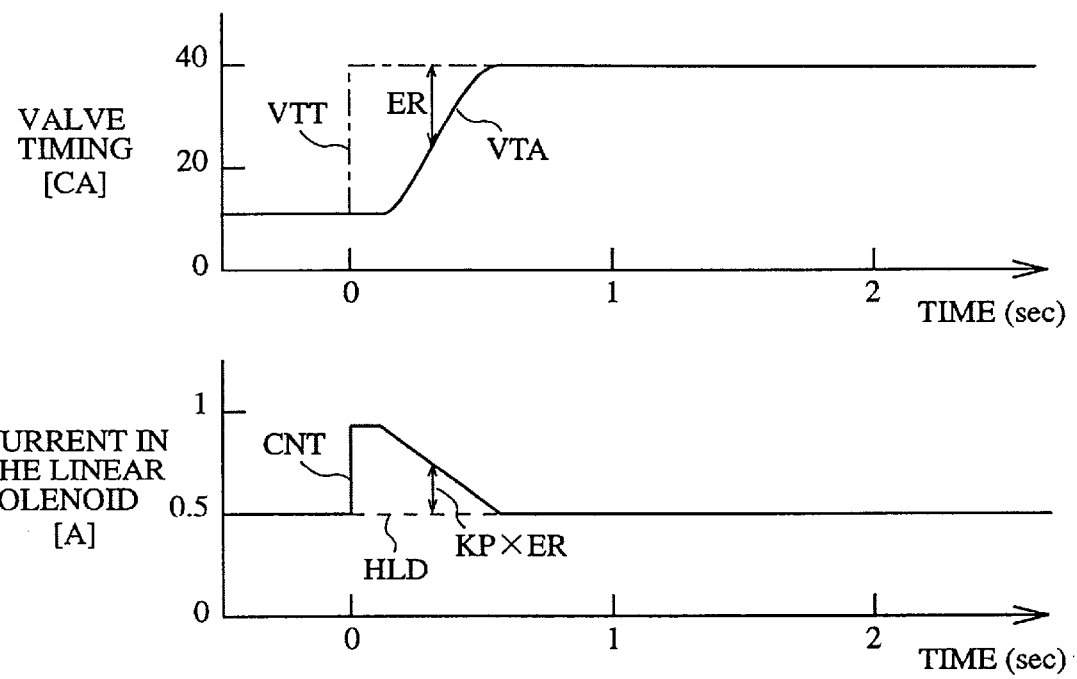
FIG. 14 is a time chart for explaining the operation of a controller having no integral element, when the actual holding current HLD is identical with a standard holding current 0.5 A.
Figure 15:
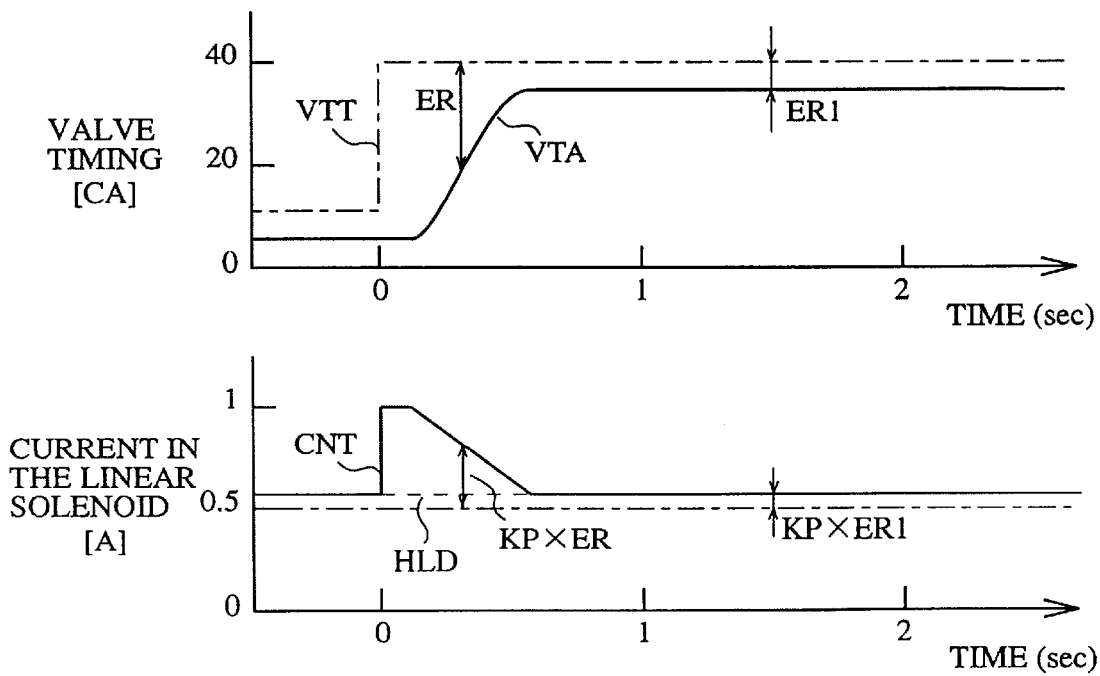
FIG. 15 is a time chart for explaining the operation of a controller having no integral element, when the actual holding current HLD is biased toward the greater side compared with the standard holding current 0.5 A.

FIG. 14 is a time chart for explaining the operation of a controller having no integral element, when the actual holding current HLD is the standard holding current 0.5 A. FIG. 15 is a time chart for explaining the operation of a controller having no integral element when the actual holding current HLD is biased toward the high current side compared with the standard holding current 0.5 A. FIG. 16 is a time chart for explaining the operation of a controller having an integral element, when the actual holding current HLD is biased toward the high current side compared with the standard holding current 0.5 A.

OCV 80 can control the amount of working oil delivery per unit time. On the other hand, the change angle, which means a change of valve timing expressed by a phase of the crank angle, is determined by the amount of the accumulated working oil delivered into the actuator 40. In other words, the actuator 40, which is an object of the control, contains an integral element. Thus, when the actual hold current HLD is the standard value 0.5 A, using a proportional control according to the error ER between the theoretical valve timing VTT and the actual valve timing VTA, and by biasing the current to the standard value of HLD 0.5 A, the actual valve timing can be controlled to converge to the theoretical valve timing. The solenoid current CNT of the OCV 80 in this control is expressed by the mathematical formula (3).

$$CNT = KP \times ER + 0.5 \text{ A} \quad (3)$$

The error ER between the theoretical valve timing VTT and the actual valve timing VTA in the formula (3) is given by the mathematical formula (4).

$$CNT = KP \times ER + 0.5 \text{ A} \quad (4)$$

The quantity KP in the formula (3) is a gain of proportional control. FIG. 14 shows how the theoretical valve timing VTT, the actual valve timing VTA and solenoid current CNT change.

The hold current HLD can not always be the standard value 0.5 A, due to various reasons as mentioned before. For example, when the actual hold current HLD is greater than the standard value 0.5 A, if the control based on the formula (3) is carried out, the actual valve timing VTA does not converge to the theoretical valve timing VTT, and remains a static error ER1, as shown in FIG. 15. The static error ER1 can be expressed by the mathematical formula (5).

$$ER1 = (HLD - 0.5 \text{ A})/KP \quad (5)$$

To avoid this problem, in the controller of a prior art, an integral control is added to the proportional control of formula (3). Namely, a control corresponding to the mathematical formula (6) is applied, for eliminating the static error.

$$CNT = KP \times ER + \Sigma KI + 0.5 \text{ A} \quad (6)$$

$\Sigma KI$ in the formula (6) is an integral correcting term, which is an accumulated value of an integral change which can be calculated from the error ER between the theoretical valve timing VTT and the actual valve timing VTT. It can be expressed by the mathematical formula (7).

$$\Sigma KI = \Sigma KI(i-1) + KI \times ER \quad (7)$$

$\Sigma KI(i-1)$ in the formula (7) is the value of the integral correction before this time. KI is the gain of the integral element. $KI \times ER$ corresponds to an integral change. The value KI is set to be very small, to prevent instability of the control, which may occur in case that the integral change fluctuates greatly by a temporal increase of the error ER at a step response process.

FIG. 16 shows the change of the theoretical valve timing VTA, the actual valve timing VTA, the solenoid current CNT at a state that no static error remains between the theoretical valve timing VTT and the actual valve timing VTA, i.e., the value ΣKI of the integral correction satisfies the mathematical formula (8)

$$HLD \approx \Sigma KI + 0.5 \text{ A} \tag{8}$$

The operations of the present embodiment of the hydraulic apparatus for adjusting the timing of opening and closing of an engine valve according to the present invention are explained below, referring FIGS. 17 to 19.

Figure 17:
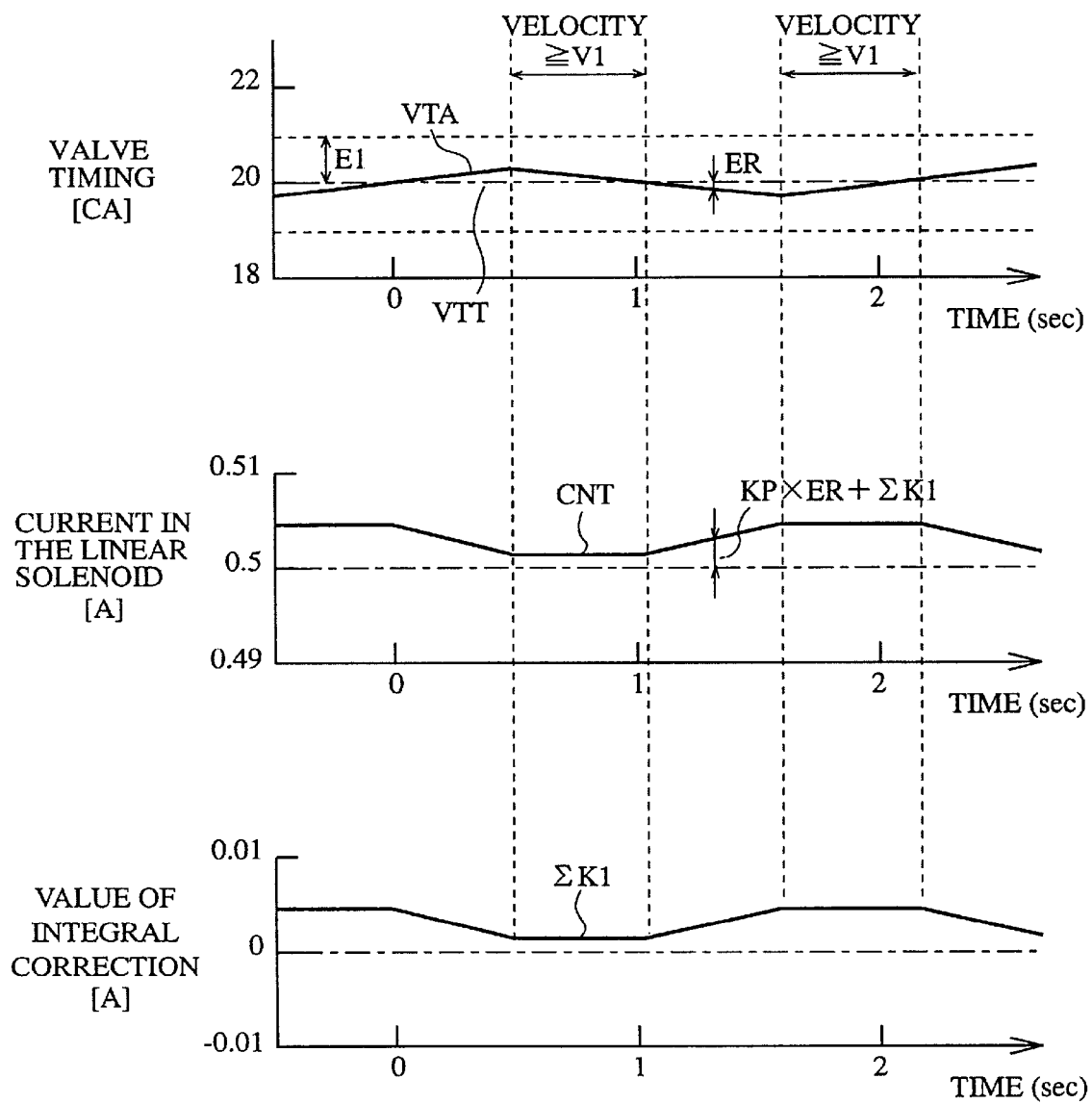
FIG. 17 is a time chart for explaining the operation of this embodiment, in the state that the actual valve timing is converged to the theoretical valve timing.

FIG. 17 is a time chart for explaining the control state, when the actual valve timing VTA is converged to the theoretical valve timing VTT. When the error ER between the theoretical valve timing VTT and the actual valve timing VTA is smaller than a previously determined value, (for example, 1° CA), it is understood that the actual valve timing is converging to the theoretical valve timing. Therefore the value of the integral change is set to be sufficiently small (for example, 0.1 mA) to make it possible to respond correctly to a small change of the hold current HLD of the OCV 80.

When the actual timing VTA is moving towards the theoretical valve timing VTT, even if the tendency is very small, it is not necessary to increase or decrease the value of the integral correction ΣKI. Accordingly, when the actual valve timing VTA is moving towards the theoretical valve timing VTT at a speed greater than a predetermined integral stopping speed V1 (for example 0.01° CA/25 ms), the integral calculation of the integral change is made stop.

Figure 18:
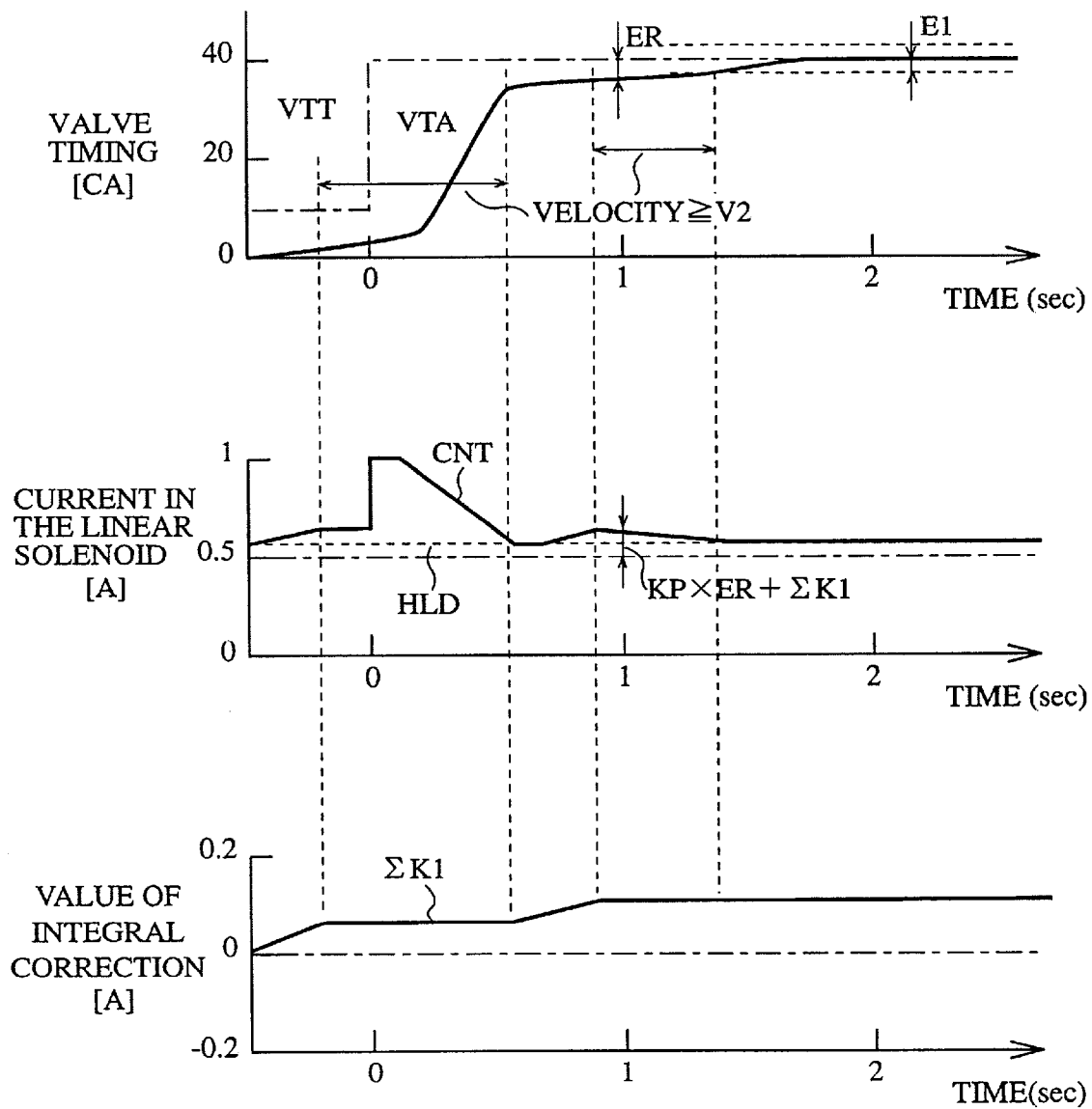
FIG. 18 is a time chart for explaining the operation of this embodiment, in the state that there is a static error between the actual valve timing and the theoretical valve timing.

FIG. 18 is a time chart for explaining the operation of this embodiment, when there is a static error between the actual valve timing and the theoretical valve timing. When the absolute value of error ER between the theoretical valve timing VTT and the actual valve timing VTA is greater than a predetermined value E1, and the actual valve timing VTA is moving towards the theoretical valve timing VTT at a speed greater than the predetermined integral stopping speed, it is understood that a static error between the theoretical valve timing and the actual valve timing is occurred. In such case, the value of the integral change is set to be a value KI2 (for example 1 mA), which is greater than the aforementioned value KI1, so as to make a rapid control towards the direction to eliminate the static error.

If the predetermined integral stopping speed rests unchanged at the value V1, even though the value of the integral change is set to be greater, the value of the integral change will stop, at the moment that the change speed of the actual valve timing VTA reaches the value V1. Thus the change speed of the actual valve timing VTA can not exceed the value V1. When the absolute value of the error ER is greater than a predetermined value E1, by setting the integral stopping speed to be a value V2 (for example, 0.1° CA/25 ms), which is greater than the value V1, the actual valve timing VTA can approach the theoretical valve timing, at a speed V2.

Figure 19:
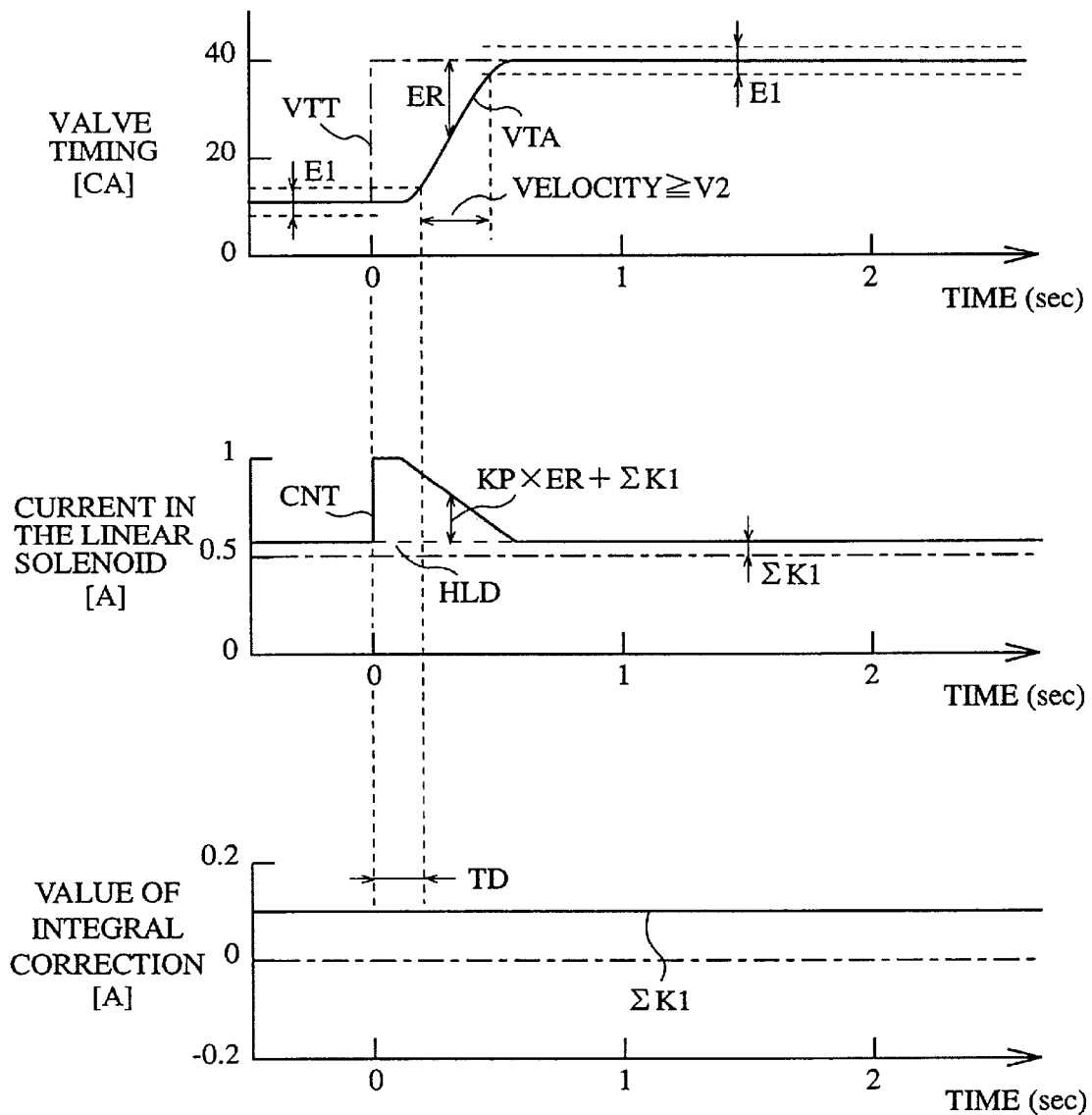
FIG. 19 is a time chart for explaining the operation at a step response of this embodiment, in the state that the integral compensation value is stable.

FIG. 19 is a time chart for explaining the operation at a step response of this embodiment, when a state that the integral correction value is stable. Occasionally, the actual valve timing TVA does not move or the moving speed is slow, after a change of the theoretical valve timing VTT. This phenomenon can be caused, for example, by a delay in the delivery of the working oil. In such a state, the absolute value of error between the theoretical valve timing VTT and actual valve timing VTA is greater than the predetermined value E1. Thus, if the aforementioned control is applied, it is misunderstood that there is a static error, and the integral change and the integral stopping speed are set to be a value KI2 and VI2, respectively. Namely the value of integral correction KI is increased or decreased, nevertheless it is not necessary for the proper funtioning of this controller.

This problem can be solved, by setting the value of integral change and the integral stopping speed to be KI1 and V1, respectively, during a predetermined period TD (for example 0.2 sec) from the moment that the absolute value of the error ER exceeds the predetermined value E1 and becomes greater than the value E1. This setting is similar to the case that the absolute value of the error ER is smaller than the predetermined value E1.

By this control, the increase or decrease of the integral correction ΣKI can be suppressed to be small, when the theoretical valve timing VTT has changed and the actual valve timing has not yet moved. And the actual valve timing VTA begins to move towards the theoretical valve timing VTT, even though the speed is very small, the calculation of the integral change stops, as a result, the value of the integral correction ΣKI hardly changes.

After an elapse of a predetermined period TD, the accumulation of the value of the integral change is stopping, because the actual valve timing VTA is moving towards the theoretical valve timing VTT a t a speed greater than the value V2.

When the actual valve timing VTA approaches further to the theoretical valve timing VTT, its speed of the value change reduces. However, when the error ER between the actual valve timing VTA and the theoretical valve timing VTT becomes smaller than a predetermined value E1, the integral stopping speed and the value of the integral change becomes a small value V1 and KI1, respectively. Thus the value of the integral correction ΣKI does not fluctuate unnecessarily, and the actual valve timing VTA converges in a stable manner to the theoretical valve timing VTT.

The aforementioned operation is explained below, referring FIG. 20, which is an operation flow diagram of the control program stored in the ROM 103. The program of this operation flow is executed in the CPU 102 in the ECU 100 at every predetermined time, for example, at every 25 ms.

Figure 20:
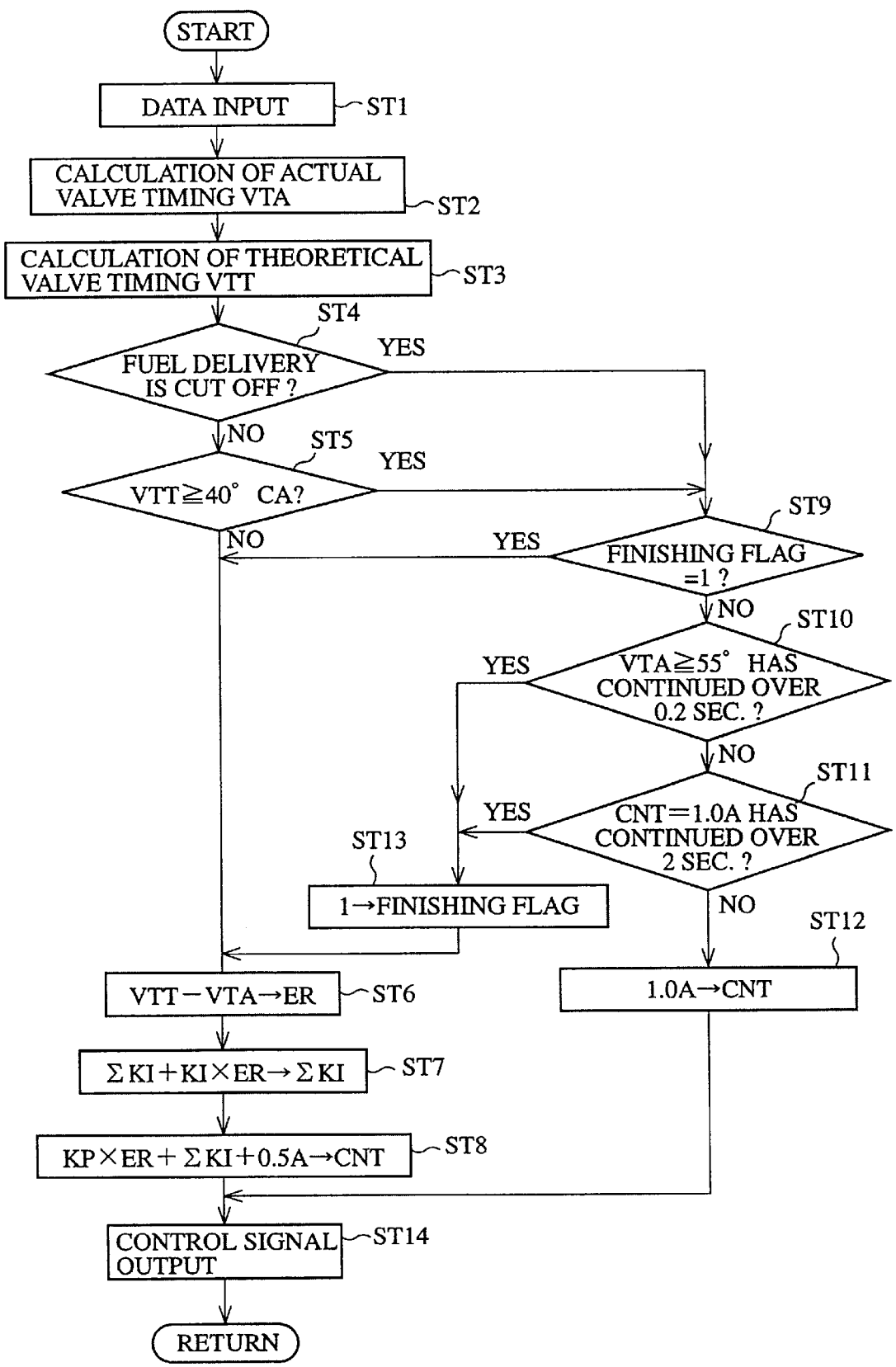
FIG. 20 is a flow chart of an embodiment of the present invention.

In FIG. 20, at a step ST1, the period T of the crank angle signal, the engine rotation ratio NE, the phase difference time TVT, the amount QA of intake air, the opening degree TVO of the throttle and the temperature THW of coolant water are inputted from the crank angle sensor 6, cam angle sensor 24, sensor 28 of intake air amount, throttle sensor 27, and the sensor 12 of coolant water.

In a step ST2, the actual valve timing VTA, which corresponds to the shift angle of the intake side cam shaft 19 regarding to the crank shaft 5, is calculated from the period T of the crank angle signal and the phase difference time TVT, using the formula (2).

In step a ST3, a theoretical valve timing VTT is calculated from the engine rotation ratio NE, the amount of the intake air QA, the opening degree of the throttle TVO and the temperature THW of the coolant water.

In a step ST4, it is judged as to whether the fuel delivery to the combustion chamber 8 by the injector 30 is being cut off. If the fuel delivery is being cut off, a step ST9 is followed. In the other case, a step ST5 is followed.

In the step ST5, it is judged as to whether the theoretical valve timing VTT is near to the maximum timing advance (for example VTT≧40° CA). If the inequality VTT≧40° CA stands, the step ST9 is followed, in the other case, steps ST6 to 8 are followed. Thus the OCV 80 is controlled so as that the VTA converges to the VTT.

In the step ST9, if the fuel delivery is being cut off, or if the inequality VTT≧40° CA stands, it is judged as to whether a finish flag is raised or not. If the finish flag is raised, the step ST6 is followed, in the other case, a step ST10 is followed.

In the step ST10, it is judged as to whether a state that the actual valve timing VTA is greater than 55° (VTA≧55°) has continued over 2 sec or not. If the state has not continued over 2 sec, a step ST11 is followed.

In the step ST11, it is judged as to whether the solenoid current CNT is a predetermined value (for example CNT= 1.0 A) and has continued over a predetermined period (for example 2 sec) or not. If such a state has not continued over 2 sec, a step ST12 is followed.

In the step ST12, the solenoid current of the OCV 80 is controlled so as that it equals 1.0 A.

In this way, while the fuel delivery to the engine is being cut off, the solenoid current CNT of the OCV 80 is controlled to equal 1.0 A in the step ST12, this causes a working oil delivery to the actuator 40 from the OCV 80, then the rotor 44 rotates further from the position at the moment of the fuel cutting off, which corresponds to an actual valve timing position. By this further rotation of the rotor 44, the inner surface of the housing 42 is cleaned, (cleaning mode).

In general, the fuel delivery is cut off at the deceleration of the engine. However, there is a case that the engine is accelerated just after a deceleration, and the engine enters into an acceleration mode without being sufficiently decelerated. In such a case, the cleaning mode is cancelled at the steps ST9 and ST13.

The rotor is rotated towards the timing advance at most, at the middle range of load and velocity of the engine. Thus it is preferable to set a cleaning mode at this state that the rotor is rotated towards the timing advance at most. Even though the theoretical valve timing VTT is near to the maximum timing advance (for example, VTT≧40° CA), the solenoid current of the OCV 80 can be controlled so as to execute the cleaning of the inner housing, by rotating the rotor further up to the maximum timing advance, to run the engine at the full efficiency,.

Moreover, even if it is judged that the state that the solenoid current CNT is 1.0 A has continued over 2 sec at the step ST11, it can be understand that the rotor has rotated up to the position of the maximum timing advance. Under such a condition, if it is judged that the state in which the inequality VTA≧55° stands has not continued over 2 sec at the step ST10, it is possible to control to return immediately the rotor towards the timing retard at the moment, as a variation of the present invention.

Regarding the finish flag in the aforementioned embodiment: if the flag is designed to be reset (0→finish flag) at the moment that the power supply of the engine is cut off, the cleaning is executed only one time while the power supply is ON, if the flag is designed to be reset at the moment of idling of the engine, the cleaning is executed one time during a cycle of idling—running—idling of the engine.

The following advantages can be obtained by the present invention:

The housing of the actuator can be cleaned by the rotor, while the fuel delivery of the engine is cut off, because the hydraulic apparatus for adjusting the timing of opening and closing of an engine valve according to the present invention comprises:

an timing advance control means M13 for controlling the hydraulic media providing means M10 so as to rotate the rotor further from the position at the moment of fuel cutting off, while the fuel provision is cut off;

a cleaning condition judging means M14 which judges as to whether the rotor shall be further rotated, depending on the engine state, for example, rotation rate and load of the engine M1, if the result of the judgement requires a further rotation of rotor, the cleaning condition judging means M14 sets and executes a cleaning mode in which the rotor is rotated to a further advanced position so as to clean the inner surface of the housing;

a mode exchanging means M15 for exchanging the hydraulic media providing means M10 between the modes, a normal mode of engine operation without cleaning and the cleaning mode, on the ground of the operation state of the engine.

In an aspect of the present invention, the whole range of the inner surface of the housing of the actuator, where the rotor can reach, can be cleaned by the rotor, because the timing advance control means controls the hydraulic media providing means so as that the rotor rotates further from the theoretical valve timing position to reach to the maximum advanced angle position, while the fuel provision is cut off.

In another aspect of the present invention, the housing of the actuator can be cleaned according to the operation state of the engine, because the timing advance control means controls the hydraulic media providing means so as that the rotor rotates further from the theoretical valve timing position, when the theoretical valve exceed a predetermined value.

In a further other aspect of the present invention, the rotor can be returned after the cleaning of the actuator, because the advance angle control means cancels the cleaning mode at a moment after a predetermined period from the setting and execution of the cleaning mode, which is set and executed according to the result of the cleaning condition judging means.

In a further aspect of the present invention, the fuel efficiency of the engine can be improved without reducing the power zone of the engine, because the advance angle control means controls the hydraulic media providing means so that the rotor rotates to reach to the maximum advanced angle position, when the state of engine is middle range of velocity and load.

In a further aspect of the present invention, the actuator suffers no bad influence from the cleaning operation, because the advance angle control means controls the hydraulic media providing means to return immediately in the timing retard direction at the moment that the rotor reaches at the maximum advanced angle position.

What is claimed is:

1. A hydraulic apparatus for adjusting the timing of opening and closing of an engine valve comprising:

an intake valve and an exhaust valve which are driven in synchronization with the rotation of a shaft of an engine, so as to control the opening and closing of an intake channel and an exhaust channel communicating with a combustion chamber respectively, means for detecting the operational state of the engine;

means for calculating a theoretical valve timing corresponding to the operational state of the engine, based on the output of means for detecting the operational state of the engine;

an actuator for changing the timing of opening and closing of the valve, by rotating a rotor towards a timing advance position or towards a timing retard position, so as to change the timings of the opening and closing of the intake valve and/or the exhaust valve, the rotor being housed within a housing;

a hydraulic media providing means for providing a hydraulic media to the actuator to drive the rotor therein, whereby the flow rate of the media is controllable;

a timing detector for detecting the actual timings of opening and closing of the intake valve and/or the exhaust valve;

a valve timing controller for controlling the actuator, by controlling the hydraulic media providing means, so that the actual timings of opening and closing of the valves change to the theoretical valve timing;

characterized in that the hydraulic apparatus for adjusting the timing of opening and closing of an engine valve further comprises:

a timing advance control means for controlling the hydraulic media providing means so as to rotate the rotor further from its position at the moment of fuel cutting off, while a fuel provision is cut off;

a cleaning condition judging means which judges as to whether the rotor shall be further rotated, based on the engine operational state, when it judges that a further operation of the rotor is necessary, the cleaning condition judging means sets and executes the cleaning mode in which the rotor is rotated to a further advanced position so as to clean the inner surface of the housing;

a mode exchanging means for exchanging the hydraulic media providing means between the modes, a normal mode and a cleaning mode, based on the operational state of the engine, whereby cleaning is executed in the cleaning mode and is not executed in the normal mode.

2. A hydraulic apparatus for adjusting the timing of opening and closing of an engine valve according to claim 1, wherein, the timing advance control means controls the hydraulic media providing means so that the rotor rotates further from the theoretical valve timing position to reach the maximum advanced angle position, while the fuel provision is cut off.

3. A hydraulic apparatus for adjusting the timing of opening and closing of an engine valve according to claim 1, wherein, the timing advance control means controls the hydraulic media providing means so that the rotor rotates further from the theoretical valve timing position, when the theoretical valve exceeds a predetermined value.

4. A hydraulic apparatus for adjusting the timing of opening and closing of an engine valve according to claim 1, wherein, the timing advance control means cancels the cleaning mode at a moment after a predetermined period from the setting and execution of the cleaning mode, which is set and executed according to the result of the cleaning condition judging means.

5. A hydraulic apparatus for adjusting the timing of opening and closing of an engine valve according to claim 2, wherein, the advance angle control means controls the hydraulic media providing means so that the rotor rotates to reach to the maximum advanced angle position, when the state of the engine is in a middle range of speed and load.

6. A hydraulic apparatus for adjusting the timing of opening and closing of an engine valve according to claim 2, wherein, the timing advance control means controls the hydraulic media providing means to return towards the timing retard direction at the moment that the rotor reaches the maximum advanced angle position.

7. A hydraulic apparatus for adjusting the timing of opening and closing of an engine valve according to claim 5, wherein, the timing advance control means controls the hydraulic media providing means to return towards the timing retard direction at the moment that the rotor reaches the maximum advanced angle position.

* * * * *